(12) United States Patent
Abdoli et al.

(10) Patent No.: US 11,234,233 B2
(45) Date of Patent: Jan. 25, 2022

(54) CONFIGURATION OF THE INITIAL ACTIVE BANDWIDTH PART FOR INITIAL NETWORK ACCESS

(71) Applicant: Huawei Technologies Co., Ltd., Shenzhen (CN)

(72) Inventors: Javad Abdoli, Kanata (CA); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 16/839,645

(22) Filed: Apr. 3, 2020

(65) Prior Publication Data
US 2020/0252916 A1    Aug. 6, 2020

Related U.S. Application Data

(63) Continuation of application No. 16/188,779, filed on Nov. 13, 2018, now Pat. No. 10,616,877.
(Continued)

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04L 5/0092* (2013.01);
(Continued)

(58) Field of Classification Search
None
See application file for complete search history.

(56) References Cited

U.S. PATENT DOCUMENTS

2014/0307695 A1    10/2014 Yang et al.
2015/0117375 A1     4/2015 Sartori et al.
(Continued)

FOREIGN PATENT DOCUMENTS

| CN | 103634800 A | 3/2014 |
|---|---|---|
| CN | 103795513 A | 5/2014 |

(Continued)

OTHER PUBLICATIONS

Huawei, HiSilicon, "RMSI delivery", R1-1715388, 3GPP TSG RAN WG1 Meeting NR#3, Sep. 18-21, 2017, p. 1-5, Nagaya, JP.
(Continued)

*Primary Examiner* — Hong S Cho
(74) *Attorney, Agent, or Firm* — Slater Matsil, LLP

(57) ABSTRACT

Methods and devices for configuring an initial active downlink bandwidth part as part of an initial access procedure are provided. In one provided method, a base station broadcasts a synchronization signal block (SSB) that includes a control resource set (CORESET) configuration index. The CORESET configuration index is one of a plurality of CORESET configuration indexes, each CORESET configuration index being associated with a respective configuration of a CORESET. Each configuration includes a CORESET frequency size, a CORESET time duration, and a frequency offset of the CORESET with respect to the SSB selected from a set of predefined frequency offsets. The initial active downlink bandwidth part is defined as having the same frequency location and bandwidth as the CORESET. The base station transmits, as part of a physical downlink control channel (PDCCH) within the CORESET, information indicating scheduling of remaining minimum system information (RMSI) in a physical downlink shared channel (POSCH).

20 Claims, 25 Drawing Sheets

Related U.S. Application Data

(60) Provisional application No. 62/587,290, filed on Nov. 16, 2017.

(51) Int. Cl.
*H04L 27/26* (2006.01)
*H04W 56/00* (2009.01)

(52) U.S. Cl.
CPC ........ *H04L 27/2602* (2013.01); *H04L 27/266* (2013.01); *H04L 27/2613* (2013.01); *H04W 72/0453* (2013.01); *H04W 56/0035* (2013.01)

(56) References Cited

U.S. PATENT DOCUMENTS

| | | | |
|---|---|---|---|
| 2015/0334683 A1 | 11/2015 | Guo et al. | |
| 2017/0325155 A1 | 11/2017 | Zhou et al. | |
| 2019/0069322 A1* | 2/2019 | Davydov | H04W 74/006 |
| 2019/0082335 A1* | 3/2019 | Yu | H04W 76/19 |
| 2019/0098590 A1* | 3/2019 | Nam | H04W 24/08 |
| 2019/0140776 A1* | 5/2019 | Seo | H04B 7/0482 |
| 2019/0223124 A1* | 7/2019 | Tang | H04W 72/0453 |
| 2020/0344097 A1* | 10/2020 | Si | H04W 72/0453 |

FOREIGN PATENT DOCUMENTS

| | | |
|---|---|---|
| CN | 105934921 A | 9/2016 |
| WO | 2019088680 A1 | 5/2019 |

OTHER PUBLICATIONS

Huawei, HiSilicon, "RMSI delivery", R1-1717050, 3GPP TSG RAN WG1 Meeting 90bis, Oct. 9-13, 2017, pp. 1-5, Prague, CZ.

L.G. Electronics, "RMSI delivery and CORESET configuration", R1-1717927, 3GPP TSG RAN WG1 Meeting Obis, Oct. 9-13, 2017, pp. 1-6, Prague, CZ.

Samsung, "Remaining details on remaining minimum system information delivery", R1-1717578, 3GPP TSG RAN NG1#90b, Oct. 9-13, 2017. pp. 1-9, Prague, CZ.

Vivo, "Discussion on Remaining Minimum System Information", R1-1717461, 3GPP TSG RAN WG1 Meeting #90bis, Oct. 9-13, 2017, pp. 1-15, Prague, CZ.

\* cited by examiner

CORESET configuration table

| Index (I) | CORESET frequency location | CORESET frequency size | CORESET REG bundle size | CORESET transmission type | CORESET starting symbol | CORESET time duration | CORESET monitoring window size | CORESET monitoring period |
|---|---|---|---|---|---|---|---|---|
| 1 | Starting PRB 1 | Contiguous, N1 REG bundles | B1 (2 or 6) | Interleaved or non-interleaved | L1 | n1 (1 or 2 or 3 symbols) | w1 slots | T1 ms |
| 2 | Starting PRB 2 | Non-contiguous, <br>• N2 REG bundles per contiguous part <br>• M2 REG bundles between consecutive contiguous parts | B2 (2 or 6) | Interleaved or non-interleaved | L2 | n2 (1 or 2 or 3 symbols) | w2 slots | T2 ms |
| 3 | Starting PRB 3 | Contiguous, N3 REG bundles | B3 (2 or 6) | Interleaved or non-interleaved | L3 | n3 (1 or 2 or 3 symbols) | w3 slots | T3 ms |

TDM with SS block, CORESET almost center-aligned with SS block, Alt. 1:

TDM with SS block, CORESET almost center-aligned with SS block, Alt. 2:

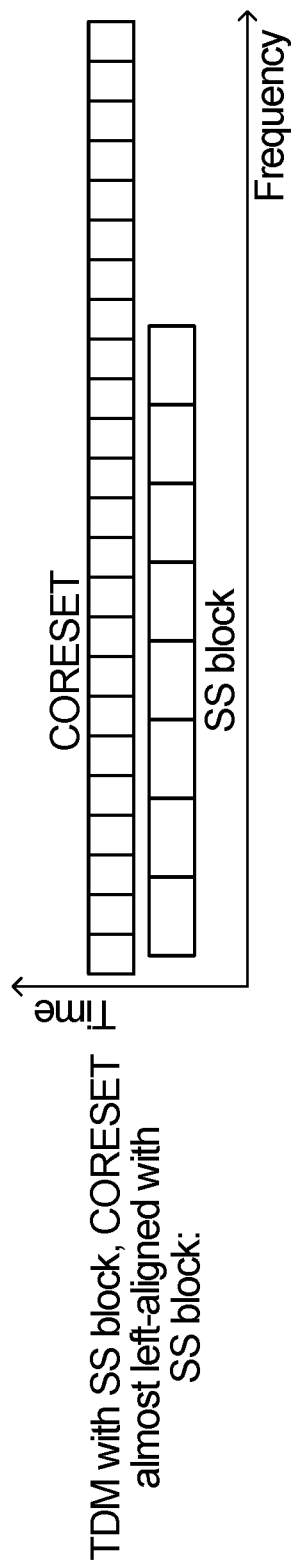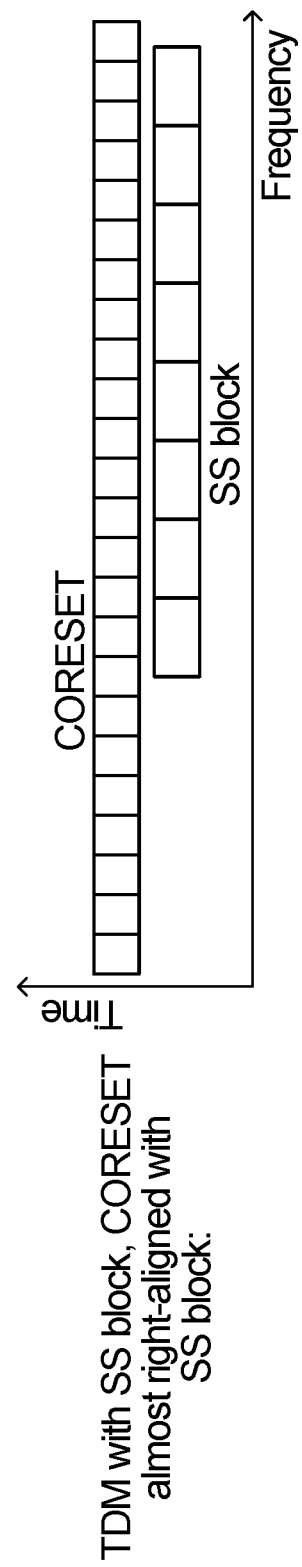
FIG. 5A
TDM with SS block, CORESET almost left-aligned with SS block:
FIG. 5B
TDM with SS block, CORESET almost right-aligned with SS block:

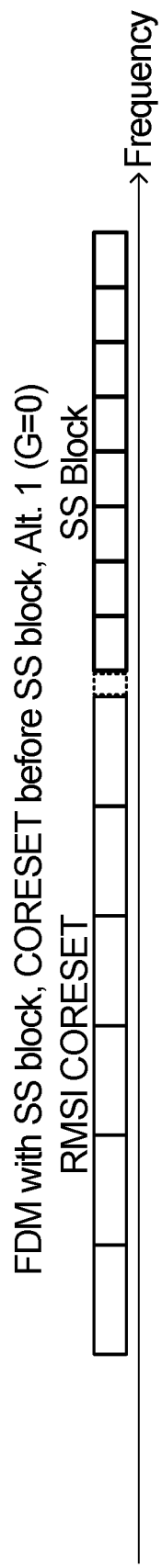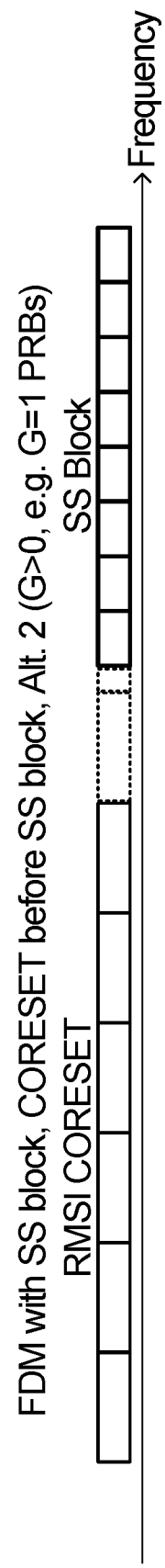
FIG. 7A
FIG. 7B

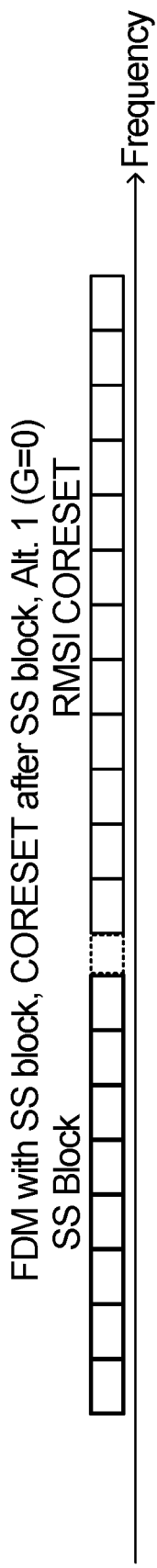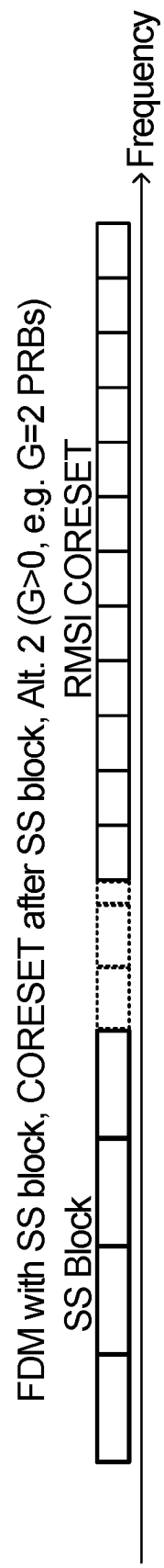
FIG. 8C
FIG. 8D

CORESET frequency configuration table

| Index (l) | CORESET frequency location | CORESET frequency size | CORESET REG bundle size | CORESET transmission type |
|---|---|---|---|---|
| 1 | FDM (SSB first, CORESET first, or center aligned) TDM (left, right, or center align) | Contiguous, N1 REG bundles | B1 | Interleaved or non-interleaved |
| 2 | FDM (SSB first, CORESET first, or center aligned) TDM (left, right, or center align) | Non-contiguous,<br>• N2 REG bundles per contiguous part<br>• M2 REG bundles between consecutive contiguous parts | B2 | Interleaved or non-interleaved |
| 3 | FDM (SSB first, CORESET first, or center aligned) TDM (left, right, or center align) | Contiguous, N3 REG bundles | B3 | Interleaved or non-interleaved |
| 4 | ... | ... | ... | ... |

CORESET time configuration table

| Index (l) | CORESET starting symbol | CORESET time duration | CORESET monitoring window size | CORESET monitoring period |
|---|---|---|---|---|
| 1 | L1 | n1 (1 or 2 or 3 symbols) | w1 slots | T1 ms |
| 2 | L2 | n2 (1 or 2 or 3 symbols) | w2 slots | T2 ms |
| ... | | | ... | ... |

FIG. 9

CORESET configuration sub-table 1:

| Index (I1) | CORESET-SSB relative time-frequency location |
|---|---|
| 1 | FDM, SSB first, without guard PRBs |
| 2 | FDM, SSB first, with guard PRBs |
| 3 | FDM, CORESET first, without guard PRBs |
| 4 | FDM, CORESET first, with guard PRBs |
| 5 | FDM, center aligned |
| 6 | TDM, left aligned |
| 7 | TDM, right aligned |
| 8 | TDM, center aligned |

CORESET configuration sub-table 2:

| Index (I2) | CORESET frequency size | CORESET time duration (symbols) | REG bundle size |
|---|---|---|---|
| 1 | Single contiguous part: 8 REG bundles | 1 | 6 |
| 2 | Single contiguous part: 8 REG bundles | 2 | 6 |
| 3 | Single contiguous part: 16 REG bundles | 3 | 6 |
| 4 | 8 contiguous parts<br>Each contiguous part: 1 REG bundle<br>Between contiguous parts: 1 REG bundle | 1 | 6 |
| 5 | 24 contiguous parts<br>Each contiguous part: 1 REG bundle<br>Between contiguous parts: 1 REG bundle | 2 | 2 |
| 6 | 8 contiguous parts<br>Each contiguous part: 1 REG bundle<br>Between contiguous parts: 1 REG bundle | 2 | 6 |
| 7 | 8 contiguous parts<br>Each contiguous part: 1 REG bundle<br>Between contiguous parts: 3 REG bundles | 2 | 6 |
| 8 | 8 contiguous parts<br>Each contiguous part: 2 REG bundles<br>Between contiguous parts: 2 REG bundles | 3 | 6 |

FIG. 10

CORESET configuration sub-table for below 6GHz:

| RMSI SCS of 15KHz | RMSI SCS of 30KHz | RMSI SCS of 60KHz |
|---|---|---|
| CORESET frequency size (PRBs) | CORESET frequency size (PRBs) | CORESET frequency size (PRBs) |
| 25 | 11 | 11 |
| 52 | 24 | 18 |
| 79 | 38 | 24 |
| 106 | 51 | 31 |
| 133 | 65 | 51 |
| 216 | 106 | 65 |
| 270 | 133 | 79 |
|  | 162 | 107 |
|  | 217 | 135 |
|  | 273 |  |

FIG. 11

CORESET configuration sub-table for above 6GHz:

| RMSI SCS of 60KHz | RMSI SCS of 120KHz |
|---|---|
| CORESET frequency size (PRBs) | CORESET frequency size (PRBs) |
| 66 | 32 |
| 132 | 66 |
| 264 | 132 |
|  | 264 |

FIG. 12

CONFIGURATION OF THE INITIAL ACTIVE BANDWIDTH PART FOR INITIAL NETWORK ACCESS

CROSS-REFERENCE TO RELATED APPLICATIONS

This application is a continuation of U.S. patent application Ser. No. 16/188,779, entitled "CONFIGURATION OF THE INITIAL ACTIVE BANDWIDTH PART FOR INITIAL NETWORK ACCESS" filed Nov. 13, 2018, which claims the benefit of U.S. Provisional Patent Application No. 62/587,290 entitled "CONFIGURATION OF THE INITIAL ACTIVE BANDWIDTH PART FOR INITIAL NETWORK ACCESS" filed Nov. 16, 2017, the applications of which are incorporated herein by reference in their entireties.

TECHNICAL FIELD

The present disclosure relates generally to wireless communications and, in particular, to configuration of an initial active bandwidth part for initial access and associated methods and apparatus.

BACKGROUND

In wireless communication systems, an electronic device (ED), such as a user equipment (UE), wirelessly communicates with a Transmission and Receive Point (TRP), termed "base station", to send data to the ED and/or receive data from the ED. A wireless communication from an ED to a base station is referred to as an uplink (UL) communication. A wireless communication from a base station to an ED is referred to as a downlink (DL) communication.

Resources are required to perform uplink and downlink communications. For example, an ED may wirelessly transmit data to a base station in an UL transmission at a particular frequency and during a particular time slot. The frequency and time slot used is an example of a physical communication resource.

An ED requires some minimum system information upon initial access in order to synchronize and configure the ED for communication with the system. A portion of this system information may be provided by way of periodically broadcast synchronization signal blocks (SSBs). However, not all of the minimum system information can be provided in SSBs due to overhead considerations.

SUMMARY

Because it is not practical to broadcast all of the minimum system information in SSBs due to the overhead problem noted above, some remaining portion of the minimum system information, which may be referred to as remaining minimum system information (RMSI) has to be scheduled using a physical downlink control channel (PDCCH) transmitted in a control resource set (CORESET). However, the problem exists as to how an ED, during initial access, locates the CORESET that includes a PDCCH that schedules a PDCSH, which includes the RMSI.

Aspects of this disclosure provide mechanisms to configure a CORESET for scheduling and delivering RMSI and to inform an ED of the CORESET configuration during initial access.

One aspect of the present disclosure provides a method for a base station in a wireless communication network. The method includes broadcasting, as part of a SSB, a CORESET configuration index. The CORESET configuration index is one of a plurality of CORESET configuration indexes, each CORESET configuration index being associated with a respective configuration of a CORESET. Each configuration includes a CORESET frequency size, a CORESET time duration, and a frequency offset of the CORESET with respect to the SSB, the frequency offset selected from a set of predefined frequency offsets. The set of predefined frequency offsets may include one or more of: a first frequency offset wherein a frequency location of the CORESET is substantially aligned with respect to a lowest frequency location of the SSB; a second frequency offset wherein the frequency location of the CORESET is substantially aligned with respect to a highest frequency location of the SSB; and a third frequency offset wherein the frequency location of the CORESET is substantially aligned with respect to a center frequency location of the SSB.

In some embodiments of the first aspect of the present disclosure, a first subset of the configurations define the CORESET as being time division multiplexed (TOM) with the SSB, and a second subset of the configurations define the CORESET as being frequency division multiplexed (FOM) with the SSB.

In some embodiments of the first aspect of the present disclosure, for the first subset of the configurations that define the CORESET as being TOM with the SSB, the first frequency offset is such that the lowest physical resource block (PRB) of the CORESET is the highest PRB among those whose subcarrier 0 lies on or before the subcarrier 0 of the lowest PRB of the SSB, the second frequency offset is such that the highest PRB of the CORESET is the lowest PRB among those whose subcarrier 0 lies on or after the subcarrier 0 of the highest PRB of the SSB, and the third frequency offset is such that a center PRB of the CORESET is the highest PRB among those whose subcarrier 0 lies on or before the subcarrier 0 of a center PRB of the SSB.

In some embodiments of the first aspect of the present disclosure, for the second subset of the configurations that define the CORESET as being FOM with the SSB, the first frequency offset is such that the highest PRB of the CORESET is separated from the lowest PRB of the SSB by a guard comprising at least G PRBs of a numerology of a remaining minimum system information (RMSI) transmission, where G is an integer ≥0, and the second frequency offset is such that the lowest PRB of the CORESET is separated from the highest PRB of the SSB by a guard comprising at least G PRBs of the numerology of the RMSI transmission, where G is an integer ≥0.

In some embodiments of the first aspect of the present disclosure, a value of the frequency offset is a number of physical resource blocks (PRBs) of a PRB grid of a numerology of a remaining minimum system information (RMSI) transmission.

In some embodiments of the first aspect of the present disclosure, the CORESET configuration associated with the CORESET configuration index is based on the subcarrier spacing of the CORESET.

In some embodiments of the first aspect of the present disclosure, the CORESET configuration associated with the CORESET configuration index is based on the operating frequency range of the wireless communication network.

In some embodiments of the first aspect of the present disclosure, the CORESET configuration index is an index to a row in a first CORESET configuration sub-table, each row of the first CORESET configuration sub-table defining a respective one of a plurality of first sub-configurations of the CORESET. In such embodiments, the method may further include broadcasting, as part of the SSB, a second CORESET configuration index, the second CORESET configuration index being an index to a row in a second CORESET configuration sub-table, each row of the second CORESET configuration sub-table defining a respective one of a plurality of second sub-configurations of the CORESET, each second sub-configuration comprising a time configuration of the CORESET.

A second aspect of the present disclosure provides a base station that includes a memory storage that includes instructions, and one or more processors in communication with the memory storage, wherein the one or more processor execute the instructions to implement a method according to the first aspect of the present disclosure or any one or more of the embodiments described above.

A third aspect of the present disclosure provides a method for an electronic device in a wireless communication network. The method includes receiving, as part of a SSB, a CORESET configuration index. The CORESET configuration index is one of a plurality of CORESET configuration indexes, each CORESET configuration index being associated with a respective configuration of a CORESET. Each configuration includes a CORESET frequency size, a CORESET time duration, and a frequency offset of the CORESET with respect to the SSB, the frequency offset selected from a set of predefined frequency offsets. The set of predefined frequency offsets may include one or more of: a first frequency offset wherein a frequency location of the CORESET is substantially aligned with respect to a lowest frequency location of the SSB; a second frequency offset wherein the frequency location of the CORESET is substantially aligned with respect to a highest frequency location of the SSB; and a third frequency offset wherein a frequency location of the CORESET is substantially aligned with respect to a center frequency location of the SSB. The method further includes configuring, in accordance with the CORESET configuration associated with the CORESET configuration index, an initial active downlink bandwidth part for receiving downlink transmissions from the wireless communication network.

In some embodiments of the third aspect of the present disclosure, a first subset of the configurations define the CORESET as being time division multiplexed (TOM) with the SSB, and a second subset of the configurations define the CORESET as being frequency division multiplexed (FOM) with the SSB.

In some embodiments of the third aspect of the present disclosure, for the first subset of the configurations that define the CORESET as being TOM with the SSB, the first frequency offset is such that the lowest physical resource block (PRB) of the CORESET is the highest PRB among those whose subcarrier 0 lies on or before the subcarrier 0 of the lowest PRB of the SSB, the second frequency offset is such that the highest PRB of the CORESET is the lowest PRB among those whose subcarrier 0 lies on or after the subcarrier 0 of the highest PRB of the SSB, and the third frequency offset is such that a center PRB of the CORESET is the highest PRB among those whose subcarrier 0 lies on or before the subcarrier 0 of a center PRB of the SSB.

In some embodiments of the third aspect of the present disclosure, for the second subset of the configurations that define the CORESET as being FOM with the SSB, the first frequency offset is such that the highest PRB of the CORESET is separated from the lowest PRB of the SSB by a guard comprising at least G PRBs of a numerology of a remaining minimum system information (RMSI) transmission, where G is an integer $\geq 0$, and the second frequency offset is such that the lowest PRB of the CORESET is separated from the highest PRB of the SSB by a guard comprising at least G PRBs of the numerology of the RMSI transmission, where G is an integer $\geq 0$.

In some embodiments of the third aspect of the present disclosure, a value of the frequency offset is a number of physical resource blocks (PRBs) of a PRB grid of a numerology of a remaining minimum system information (RMSI) transmission.

In some embodiments of the third aspect of the present disclosure, the CORESET configuration associated with the CORESET configuration index is based on the subcarrier spacing of the CORESET.

In some embodiments of the third aspect of the present disclosure, the CORESET configuration associated with the CORESET configuration index is based on the operating frequency range of the wireless communication network.

In some embodiments of the third aspect of the present disclosure, the CORESET configuration index is an index to a row in a first CORESET configuration sub-table, each row of the first CORESET configuration sub-table defining a respective one of a plurality of first sub-configurations of the CORESET. In such embodiments, the method may further include receiving, as part of the SSB, information indicating a second CORESET configuration index, the second CORESET configuration index being an index to a row in a second CORESET configuration sub-table, each row of the second CORESET configuration sub-table defining a respective one of a plurality of second sub-configurations of the CORESET, each second sub-configuration comprising a time configuration of the CORESET.

A fourth aspect of the present disclosure provides an electronic device that includes a memory storage that includes instructions, and one or more processors in communication with the memory storage, wherein the one or more processors execute the instructions to implement a method according to the third aspect of the present disclosure or any one or more of the embodiments described above.

Other aspects and features of embodiments of the present disclosure will become apparent to those ordinarily skilled in the art upon review of the following description.

BRIEF DESCRIPTION OF THE DRAWINGS

Embodiments of the present disclosure will be described in greater detail with reference to the accompanying drawings:

FIG. 2 is a table depicting control resource set (CORESET) time-frequency configurations and associated indexes, frequency configuration parameters and time configuration parameters in accordance with an embodiment of the present disclosure.

FIG. 5A is a time-frequency diagram showing an example of a CORESET time-frequency configuration in which the CORESET is time division multiplexed with a SSB and is substantially left-aligned in frequency with the SSB in accordance with an embodiment of the present disclosure where the subcarrier spacing (SCS) of SSB is larger than the SCS of CORESET and RMSI.

FIG. 5B is a time-frequency diagram showing an example of a CORESET time-frequency configuration in which the CORESET is time division multiplexed with a SSB and is substantially right-aligned in frequency with the SSB in accordance with an embodiment of the present disclosure where the subcarrier spacing (SCS) of SSB is larger than the SCS of CORESET and RMSI.

FIG. 7A is a time-frequency diagram showing a first example of a CORESET time-frequency configuration in which the CORESET is frequency division multiplexed with a SSB and is substantially left-aligned in frequency with the SSB in accordance with an embodiment of the present disclosure where the subcarrier spacing (SCS) of SSB is smaller than the SCS of CORESET and RMSI.

FIG. 7B is a time-frequency diagram showing a second example of a CORESET time-frequency configuration in which the CORESET is frequency division multiplexed with a SSB and is substantially left-aligned in frequency with the SSB in accordance with an embodiment of the present disclosure where the subcarrier spacing (SCS) of SSB is smaller than the SCS of CORESET and RMSI.

FIG. 8C is a time-frequency diagram showing a first example of a CORESET time-frequency configuration in which the CORESET is frequency division multiplexed with a SSB and is substantially right-aligned in frequency with the SSB in accordance with an embodiment of the present disclosure where the subcarrier.

FIG. 8D is a time-frequency diagram showing a second example of a CORESET time-frequency configuration in which the CORESET is frequency division multiplexed with a SSB and is substantially right-aligned in frequency with the SSB in accordance with an embodiment of the present disclosure where the subcarrier spacing (SCS) of SSB is larger than the SCS of CORESET and RMSI.

FIG. 9 is two sub-tables depicting two CORESET sub-configurations respectively, and associated indexes and configuration parameters in accordance with an embodiment of the present disclosure.

FIG. 10 is two sub-tables depicting two CORESET sub-configurations, respectively, and associated indexes and configuration parameters in accordance with another embodiment of the present disclosure.

FIG. 11 is three CORESET configuration sub-tables that include sets of possible values for the frequency size of the CORESET for different SCS of CORESET for a system operating below 6 GHz in accordance with an embodiment of the present disclosure.

FIG. 12 is two CORESET configuration sub-tables that include sets of possible values for the frequency size of the CORESET for different SCS of CORESET for a system operating above 6 GHz in accordance with an embodiment of the present disclosure.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EE- PROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of this disclosure provide mechanisms for configuration of an initial active bandwidth part for EDs to use when first accessing and registering with a wireless radio access network (RAN). In particular, aspects of the present disclosure provide methods and devices to configure a CORESET for scheduling and delivering RMSI;

Turning now to the figures, some specific example embodiments will be

Communication System

Figure 1:
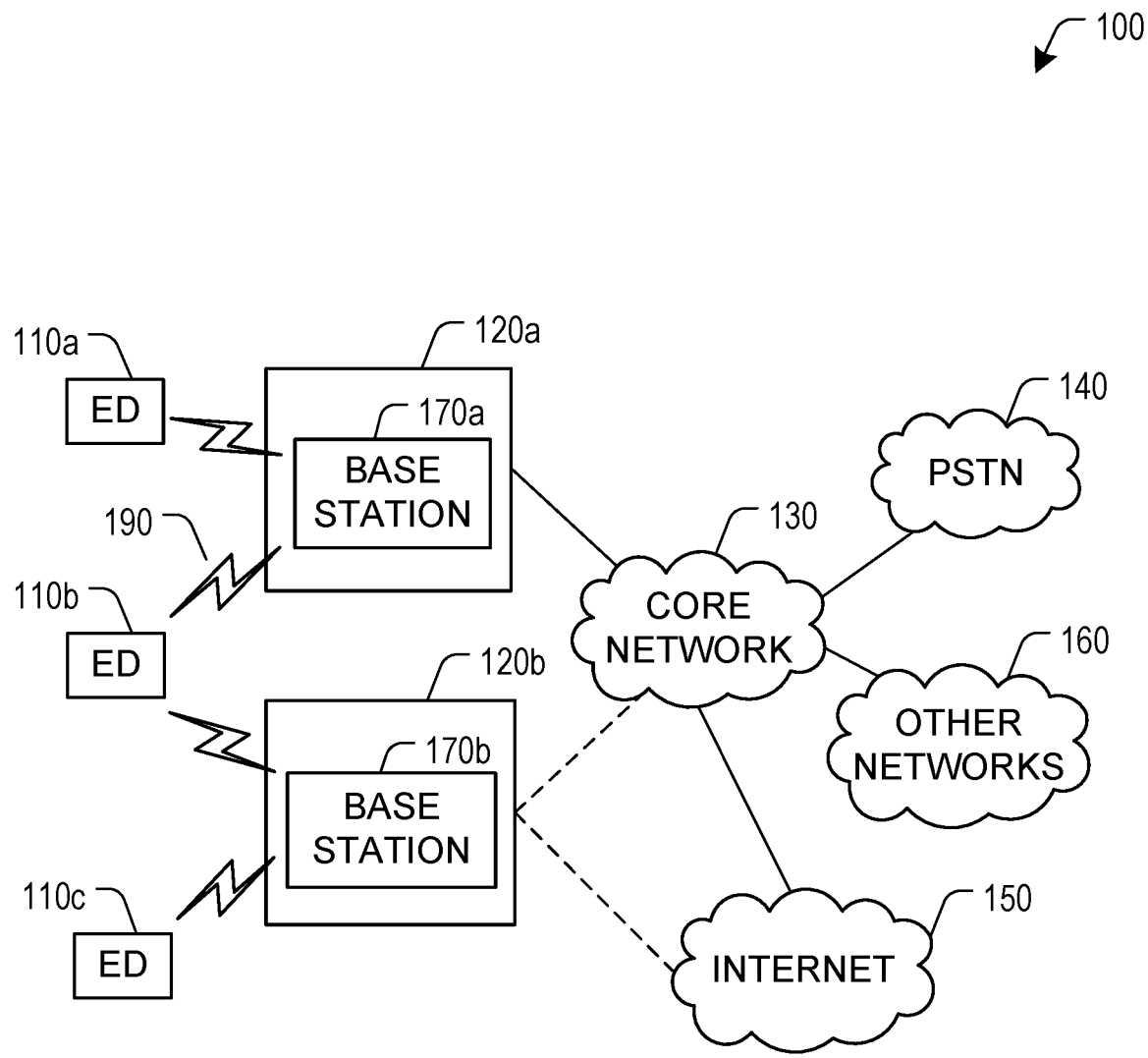
FIG. 1 is a schematic diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150o, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TOMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS 856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Initial Access

In some wireless communication systems, such as those operating in accordance with the 3rd Generation Partnership Project (3GPP) Release 13 Long Term Evolution (LTE) standard, before an ED is able to transmit or receive ED-specific signaling or data to/from a wireless communication system, an initial access process is used to synchronize and configure the ED for communication with the system. During the initial access process the ED receives system information, such as system bandwidth, which is used to configure the ED for communication with the system.

In the initial access process for 3GPP LTE, after initial cell search and selection, an ED configures a physical broadcast channel (PBCH) to receive a master information block (MIB) that includes downlink bandwidth information and physical hybrid-automatic repeat request indicator channel (PHICH) related information. After receiving MIB, the ED configures a physical downlink shared channel (PDCSH) to receive system information blocks (SIBs). The SIBs include a system information block Type 1 (SIB1) that includes PLMN information, TAC, physical cell identifier (ID) and scheduling information of other SIBs (SIB2, SIB3, SIB4, . . . ). The ED uses the scheduling information in SIB1 to receive the other SIBs. For example, the ED uses the scheduling information in SIB1 to configure PDCSH to receive the SIB2, which includes common channel information, random access channel information, random access preamble information and hybrid-automatic repeat request (HARO) information. The ED may then use the system information in SIB2 to configure the random access channel (RACH) and common shared channel and initiate uplink synchronization using a random access procedure.

In future wireless communication systems, such as the wireless communication systems being contemplated in the development of the 5G New Radio (NR) standard, some initial system information may be periodically broadcast via a PBCH within one or more periodically transmitted synchronization signal block(s) (SSB(s)). For example, the content of the PBCH within the SSBs may include an NR-MIB that includes, amongst other initial system information, configuration information for remaining minimum system information (RMSI). The RMSI configuration information may define an RMSI control resource set (CORESET) having a frequency bandwidth within which RMSI and a physical downlink control channel (PDCCH) scheduling RMSI will be contained. After receiving the NR-MIB, the ED may configure PDCCH and PDCSH to receive the RMSI. For example, there may be an RMSI PDCCH monitoring window associated with the periodically broadcast SSBs. For example, each window may have a duration of x consecutive slot(s) (e.g., x may be 1/2/4 or more consecutive slot(s)). The value of x may be frequency band dependent. In some cases, x may be configured in PBCH. The period, y, of the monitoring window can be the same as or different from the period of the SSB/PBCH burst set. For example, the value of y may be 10/20/40/80/160 or more milliseconds. In some cases, the value of y may be frequency band dependent. In some cases, y may be configured in PBCH. In some cases, the value of y may be dependent on an RMSI transmit time interval (TTI). After an ED has received the CORESET configuration via PBCH, the ED monitors, in accordance with the monitoring window, for PDCCH scheduling RMSI within the CORESET.

In the 3GPP work item for the 5G NR standard, it has been agreed that there is an initial active DL/UL bandwidth part (BWP) pair to be valid for a ED until the ED is explicitly (re)configured with bandwidth part(s) during or after RRC connection is established as part of the initial access procedure. A BWP consists of a specific number of contiguous physical resource blocks (PRBs) with a specific numerology and at a specific frequency location. It has also been agreed that the initial active DL BWP will have the same frequency location and bandwidth as the CORESET and the same numerology as RMSI, with PDCSH delivering RMSI confined within the initial active DL BWP.

Accordingly, configuring the frequency location and bandwidth of CORESET via PBCH within SSB(s) could also serve to define the initial active DL BWP valid for an ED during initial access. However, the broadcasting of SSBs to configure CORESET represents resource overhead to the system, and therefore there is a need for efficient mechanisms to convey configuration information for CORESET that provide a trade-off between complexity, overhead and performance.

Coreset Configuration

Methods and devices are provided that address the above challenges associated with configuration of the initial active DL BWP via CORESET configuration during initial access.

FIG. 2 shows an example of a CORESET time-frequency configuration table 200 for configuring the initial active DL BWP via CORESET configuration during initial access. The Example CORESET time-frequency configuration table 200 shown in FIG. 2 includes nine columns corresponding to the following properties: CORESET configuration index 202, CORESET frequency location 204, CORESET frequency size 206, CORESET resource element group (REG) bundle size 208, CORESET transmission type 210 (e.g., interleaved or non-interleaved), CORESET starting symbol 212, CORESET time duration 214, CORESET monitoring window size 216, and CORESET monitoring period 218. Embodiments of the present disclosure may include any combination of columns from this table.

For example, a time-frequency configuration for CORESET may include any one or more of the following properties:

Bandwidth (defined in terms of physical resource blocks (PRBs) according to the RMSI numerology, which may be different from that of the SSBs. Also, RMSI and SSB may have different PRB grids, e.g., CORESET frequency size 206), Frequency location/position (frequency offset relative to SSB/PBCH block, e.g., CORESET frequency location 204), A set of OFDM symbol indices in a slot corresponding to a CORESET (e.g. starting symbol 212 and number of symbols 214), CORESET transmission periodicity (e.g., CORESET monitoring period 218), Note that this CORESET may also carry control scheduling for other channels, RMSItiming configuration (including CORESET monitoring window size 216).

In some embodiments, a time-frequency configuration of CORESET is indicated by an m-bit code in PBCH in conjunction with a pre-defined CORESET time-frequency configuration table, where the m-bit code is used to signal an index (I) (e.g., CORESET configuration index 202) to a row in the CORESET time-frequency configuration table.

In the CORESET time-frequency configuration table 200 shown in FIG. 2, the frequency location of the CORESET (i.e., CORESET frequency location 204) is represented by an explicit offset to the lowest PRB of SSB. In particular, the offset is in terms of PRBs of RMSI numerology. In this example the granularity of the offset is at the PRB level, but more generally the granularity of the offset could be at PRB level, at the resource element group (REG) level, REG bundle level, or even larger. As noted above, because the PRB grid of SSB is not necessarily aligned with the PRB grid of data (where RMSI is carried via PDSCH), the offset is interpreted according to the data PRB grid of RMSI numerology.

In some cases, it may be possible to limit the number of bits that are needed to signal the CORESET time-frequency configuration by pre-defining a subset of possible frequency locations for CORESET that are defined by frequency alignment with respect to different frequency locations of the SSB. For example, in one embodiment the set of predefined frequency location configurations may include at least one of:

i) a first frequency location configuration wherein a frequency location of the CORESET is substantially aligned with respect to a lowest frequency location of the SSB;

ii) a second frequency location configuration wherein a frequency location of the CORESET is substantially aligned with respect to a highest frequency location of the SSB; and iii) a third frequency location configuration wherein a frequency location of the CORESET is substantially aligned with respect to a center frequency location of the SSB.

In some embodiments, the CORESET time-frequency configurations that are included in the CORESET time-frequency configuration table may include a first subset of the configurations defining the CORESET as being time division multiplexed (TOM) with the SSB and a second subset of the configurations define the CORESET as being frequency division multiplexed (FDM) with the SSB.

Figure 3A:
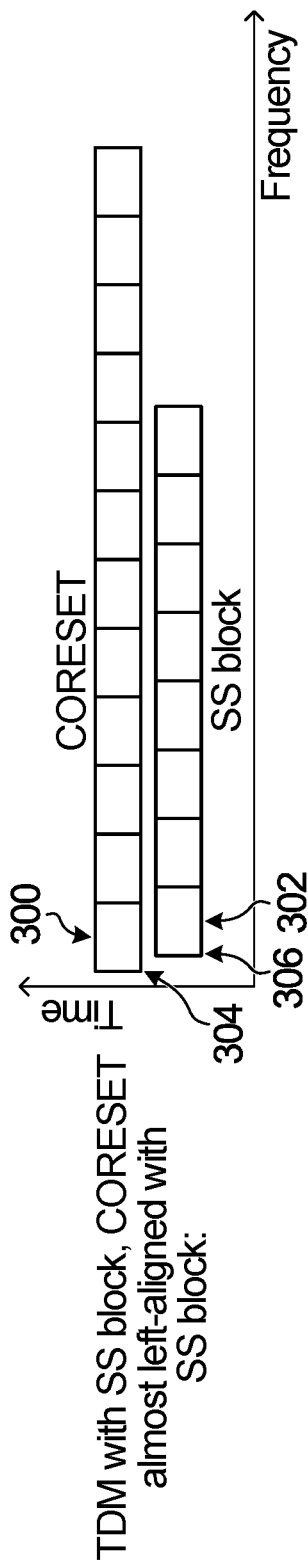
FIG. 3A is a time-frequency diagram showing an example of a CORESET time-frequency configuration in which the CORESET is time division multiplexed with a SSB and is substantially left-aligned in frequency with the SSB in accordance with an embodiment of the present disclosure.

FIG. 3A is a time-frequency diagram showing an example of a CORESET time-frequency configuration in which the CORESET is time division multiplexed with an SSB 888 and is substantially left-aligned in frequency with the SSB in accordance with an embodiment of the present disclosure.

In particular, it is noted that in the example embodiment shown in FIG. 3A the CORESET is configured such that the lowest physical resource block (PRB) 300 of the CORESET is the highest PRB among those whose subcarrier 0 304 lies on or before the subcarrier 0 306 of the lowest PRB 302 of the SSB. A "subcarrier 0" as used herein refers to a first subcarrier of a given PRB, which may be, for example, a lowest numbered subcarrier or a lowest frequency subcarrier of a set of subcarriers of the given PRB.

Figure 3B:
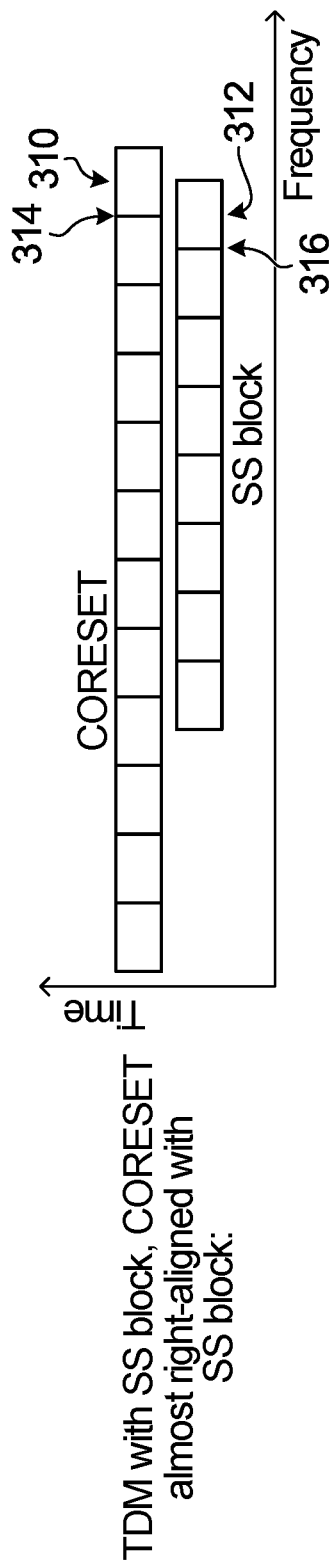
FIG. 3B is a time-frequency diagram showing an example of a CORESET time-frequency configuration in which the CORESET is time division multiplexed with a SSB and is substantially right-aligned in frequency with the SSB in accordance with an embodiment of the present disclosure.

FIG. 3B is a time-frequency diagram showing an example of a CORESET time-frequency configuration in which the CORESET is time division multiplexed with a SSB and is substantially right-aligned in frequency with the SSB in accordance with an embodiment of the present disclosure.

In particular, it is noted that in the example embodiment shown in FIG. 3B the CORESET is configured such that the highest PRB 310 of the CORESET is the lowest PRB among those whose subcarrier 0 314 lies on or after the subcarrier 0 316 of the highest PRB 312 of the SSB.

Figure 3C:
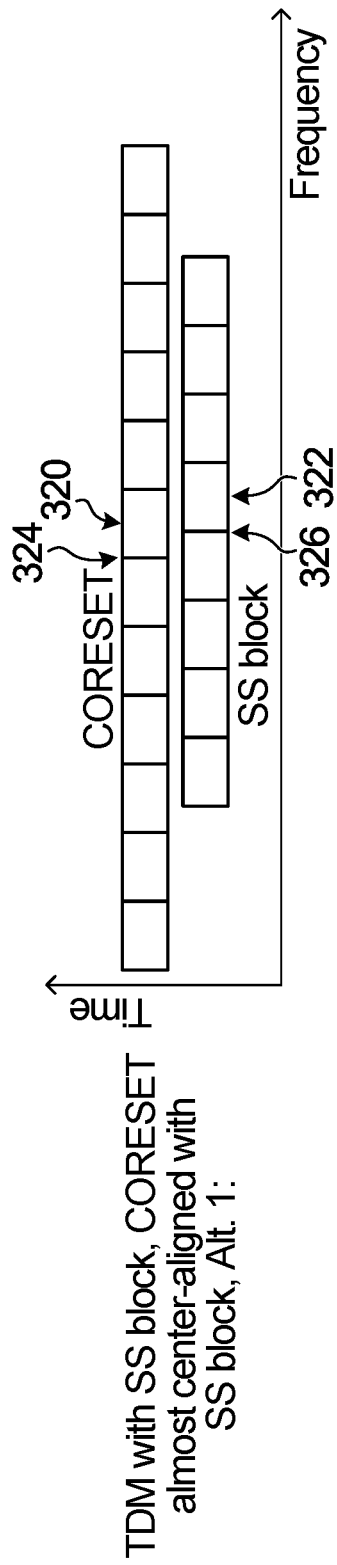
FIG. 3C is a time-frequency diagram showing a first example of a CORESET time-frequency configuration in which the CORESET is time division multiplexed with a SSB and is substantially center-aligned in frequency with the SSB in accordance with an embodiment of the present disclosure.

FIG. 3C is a time-frequency diagram showing a first example of a CORESET time-frequency configuration in which the CORESET is time division multiplexed with a SSB and is substantially center-aligned in frequency with the SSB in accordance with an embodiment of the present disclosure.

In particular, it is noted that in the example embodiment shown in FIG. 3C the CORESET is configured such that a center PRB 320 of the CORESET is the highest PRB among those whose subcarrier 0 324 lies on or before the subcarrier 0 326 of a center PRB 322 of the SSB. In the case of a CORESET and/or SSB with an even number of PRBs, the center PRB may be either the lower of the two middle PRBs or the higher of the two middle PRBs.

Figure 3D:
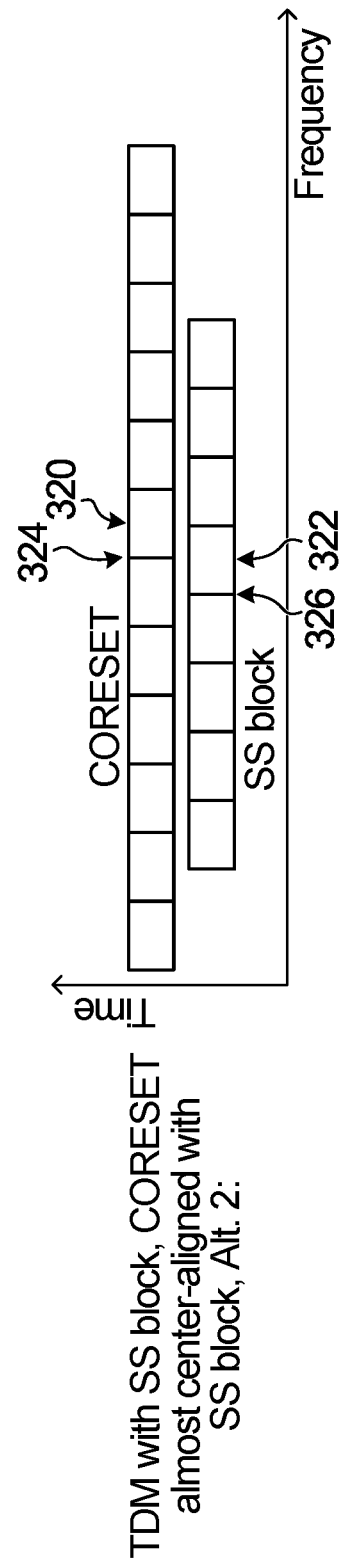
FIG. 3D is a time-frequency diagram showing a second example of a CORESET time-frequency configuration in which the CORESET is time division multiplexed with a SSB and is substantially center-aligned in frequency with the SSB in accordance with an embodiment of the present disclosure.

FIG. 3D is a time-frequency diagram showing a second example of a CORESET time-frequency configuration in which the CORESET is time division multiplexed with a SSB and is substantially center-aligned in frequency with the SSB in accordance with an embodiment of the present disclosure.

In particular, it is noted that in the example embodiment shown in FIG. 3D the CORESET is configured such that a center PRB 320 of the CORESET is the highest PRB among those whose subcarrier 0 324 lies on or after the subcarrier 0 326 of a center PRB 322 of the SSB.

As noted above, the numerology of CORESET (and RMSI itself) may be different from the numerology of SSBs. For example, in some embodiments the numerology of CORESET and RMSI may differ from the numerology of SSB in terms of one or more numerology parameters, such as subcarrier spacing (SCS). By way of example, FIGS. 4A, 4B, 4C and 4D are time-frequency diagrams that depict frequency location alignments between SSB and CORESET corresponding to those shown in FIGS. 3A, 38, 3C and 3D, but in FIGS. 4A, 4B, 4C and 4D the SCS of SSB is smaller than the SCS of CORESET and RMSI. For example, SSB may have a 15 KHz SCS and CORESET may have a 30 KHz SCS.

Similarly, FIGS. 5A, 5B, 5C and 5D are time-frequency diagrams that depict frequency location alignments between SSB and CORESET corresponding to those shown in FIGS. 3A, 3B, 3C and 3D, but in FIGS. 5A, 5B 5C and 5D the SCS of SSB is larger than the SCS of CORESET and RMSI. For example, SSB may have a 30 KHz SCS and CORESET may have a 15 KHz SCS.

Figure 4A:
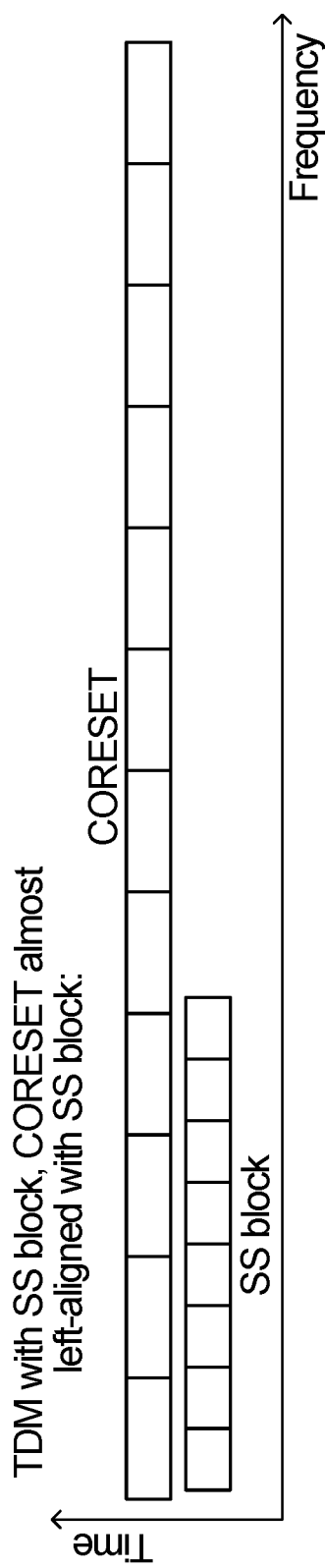
FIG. 4A is a time-frequency diagram showing another example of a CORESET time-frequency configuration in which the CORESET is time division multiplexed with a SSB and is substantially left-aligned in frequency with the SSB in accordance with an embodiment of the present disclosure where the subcarrier spacing (SCS) of SSB is smaller than the SCS of CORESET and RMSI.
Figure 4B:
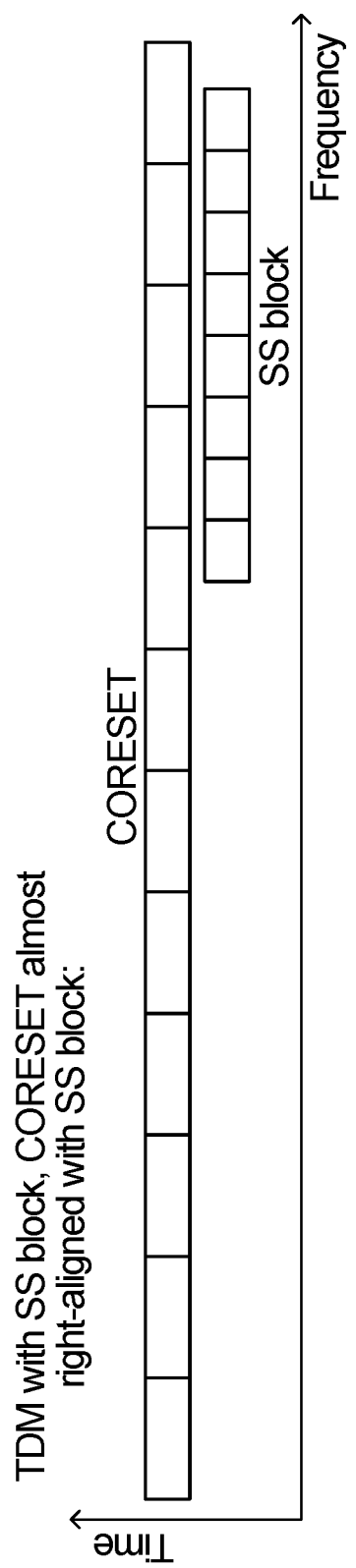
FIG. 4B is a time-frequency diagram showing an example of a CORESET time-frequency configuration in which the CORESET is time division multiplexed with a SSB and is substantially right-aligned in frequency with the SSB in accordance with an embodiment of the present disclosure where the subcarrier spacing (SCS) of SSB is smaller than the SCS of CORESET and RMSI.
Figure 4C:
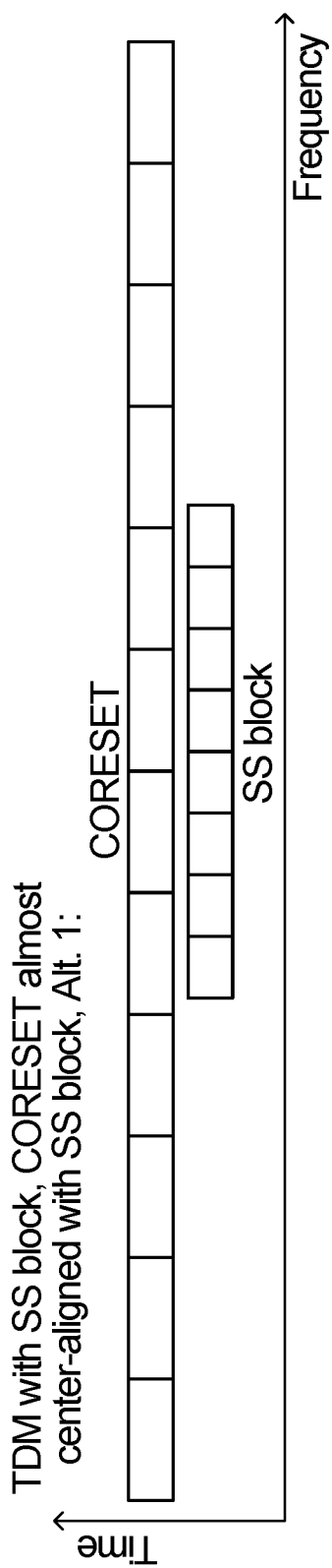
FIG. 4C is a time-frequency diagram showing a first example of a CORESET time-frequency configuration in which the CORESET is time division multiplexed with a SSB and is substantially center-aligned in frequency with the SSB in accordance with an embodiment of the present disclosure where the subcarrier spacing (SCS) of SSB is smaller than the SCS of CORESET and RMSI.
Figure 4D:
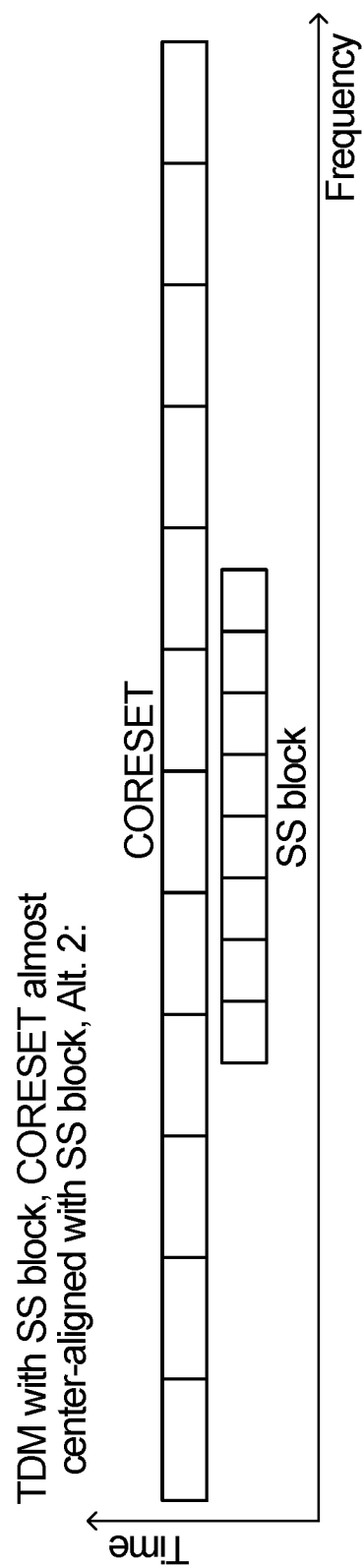
FIG. 4D is a time-frequency diagram showing a second example of a CORESET time-frequency configuration in which the CORESET is time division multiplexed with a SSB and is substantially center-aligned in frequency with the SSB in accordance with an embodiment of the present disclosure where the subcarrier spacing (SCS) of SSB is smaller than the SCS of CORESET and RMSI.
Figure 5C:
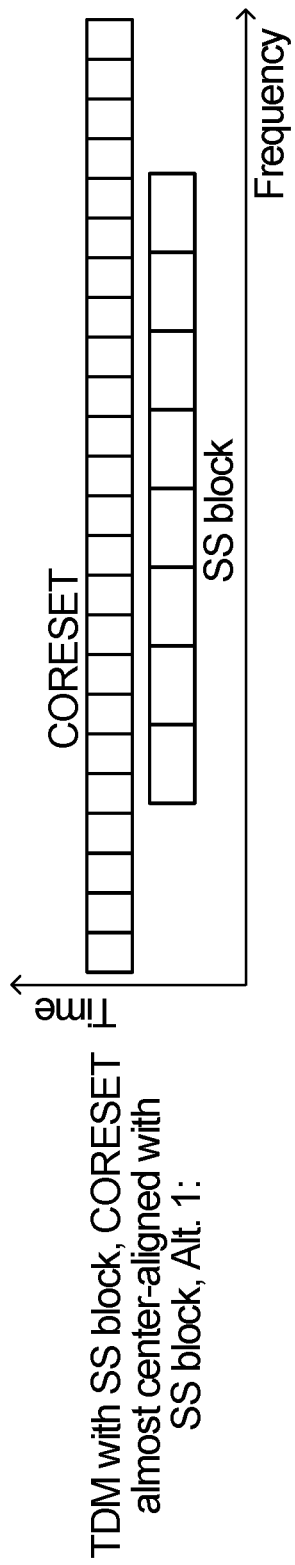
FIG. 5C is a time-frequency diagram showing a first example of a CORESET time-frequency configuration in which the CORESET is time division multiplexed with a SSB and is substantially center-aligned in frequency with the SSB in accordance with an embodiment of the present disclosure where the subcarrier spacing (SCS) of SSB is larger than the SCS of CORESET and RMSI.
Figure 5D:
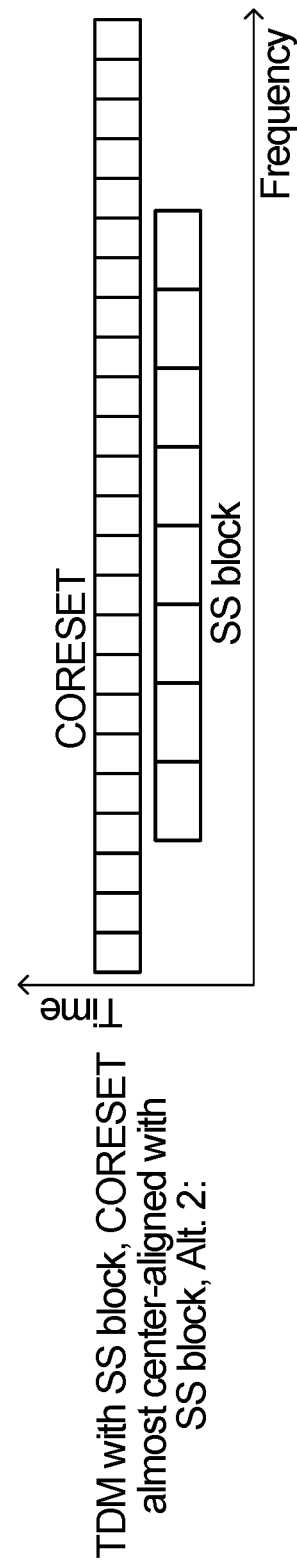
FIG. 5D is a time-frequency diagram showing a second example of a CORESET time-frequency configuration in which the CORESET is time division multiplexed with a SSB and is substantially center-aligned in frequency with the SSB in accordance with an embodiment of the present disclosure where the subcarrier spacing (SCS) of SSB is larger than the SCS of CORESET and RMSI.

In cases of mixed numerologies, such as FIGS. 4A, 4C, 4D, 5A, 5C, and 5D, the frequency offset may be defined in a similar manner as the single numerology cases shown in FIGS. 3A, 3C, and 3D. Alternatively, as depicted in FIGS. 4B and 5B, in other TOM mixed numerologies cases where the CORESET is substantially right-aligned with the SSB, the highest PRB of the CORESET is the highest PRB among those that have overlap with SSB.

Figure 6A:
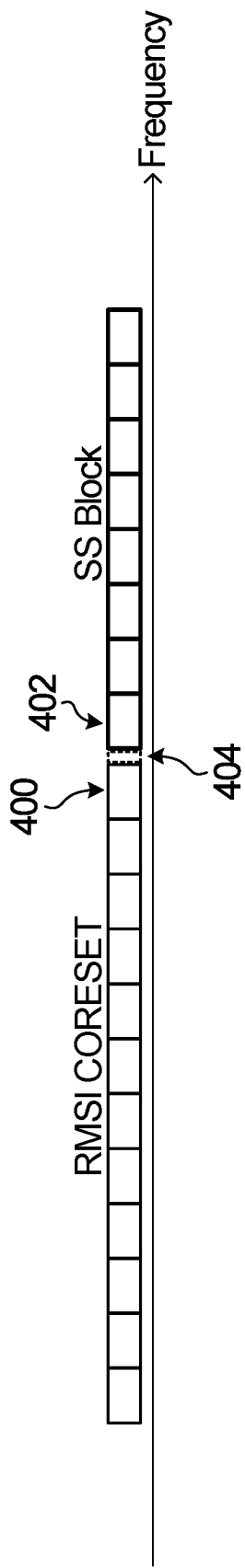
FIG. 6A is a time-frequency diagram showing a first example of a CORESET time-frequency configuration in which the CORESET is frequency division multiplexed with a SSB and is substantially left-aligned in frequency with the SSB in accordance with an embodiment of the present disclosure.

FIG. 6A is a time-frequency diagram showing a first example of a CORESET time-frequency configuration in which the CORESET is frequency division multiplexed with an SSB and is substantially left-aligned in frequency with the SSB in accordance with an embodiment of the present disclosure.

In particular, it is noted that in the example embodiment shown in FIG. 6A the CORESET is configured such that the highest PRB 400 of the CORESET is separated from the lowest PRB 402 of the SSB by a guard 404 comprising at least G PRB, where G=0. Note that the guard 404 between the CORESET and the SSB in FIG. 6A may additionally comprise a fraction of a PRB due to a subcarrier offset between the PRB grids used for RMSI and SSB.

Figure 6B:
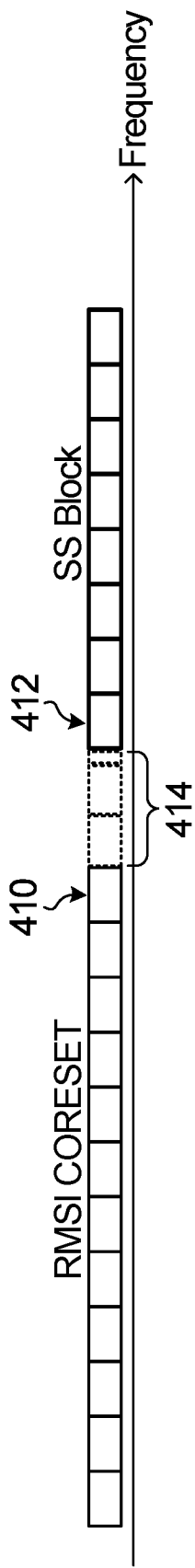
FIG. 6B is a time-frequency diagram showing a second example of a CORESET time-frequency configuration in which the CORESET is frequency division multiplexed with a SSB and is substantially left-aligned in frequency with the SSB in accordance with an embodiment of the present disclosure.

FIG. 6B is a time-frequency diagram showing a second example of a CORESET time-frequency configuration in which the CORESET is frequency division multiplexed with a SSB and is substantially left-aligned in frequency with the SSB in accordance with an embodiment of the present disclosure.

In particular, it is noted that in the example embodiment shown in FIG. 6B 68 the CORESET is configured such that the highest PRB 410 of the CORESET is separated from the lowest PRB 412 of the SSB by a guard 414 comprising at least G PRBs, where G=2. Note that in this example the total frequency offset between CORESET and the SSB provided by the guard 414 includes the two guard PRBs (PRBs according to the RMSI numerology) and the additional offset due to a difference between the PRB grids used for RMSI and SSB.

Figure 6C:
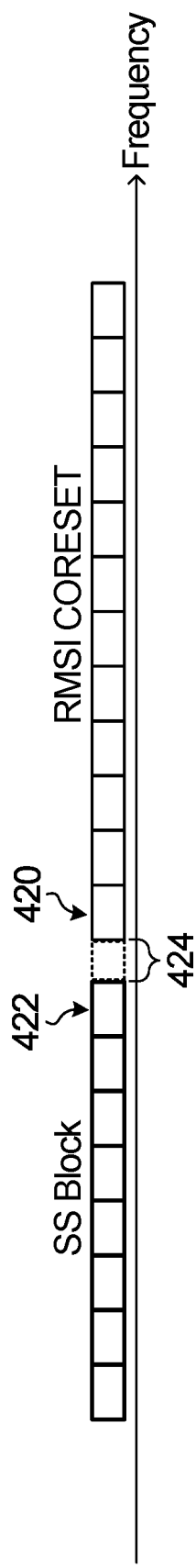
FIG. 6C is a time-frequency diagram showing a first example of a CORESET time-frequency configuration in which the CORESET is frequency division multiplexed with a SSB and is substantially right-aligned in frequency with the SSB in accordance with an embodiment of the present disclosure.

FIG. 6C is a time-frequency diagram showing a first example of a CORESET time-frequency configuration in which the CORESET is frequency division multiplexed with a SSB and is substantially right-aligned in frequency with the SSB in accordance with an embodiment of the present disclosure.

In particular, it is noted that in the example embodiment shown in FIG. 6C the CORESET is configured such that the lowest PRB 420 of the CORESET is separated from the highest PRB 422 of the SSB by a guard 424 comprising at least G PRBs, where G=0. Here again the guard 424 between the CORESET and the SSB in FIG. 6C may additionally comprise a fraction of a PRB due to a subcarrier offset between the PRB grids used for RMSI and SSB.

Figure 6D:
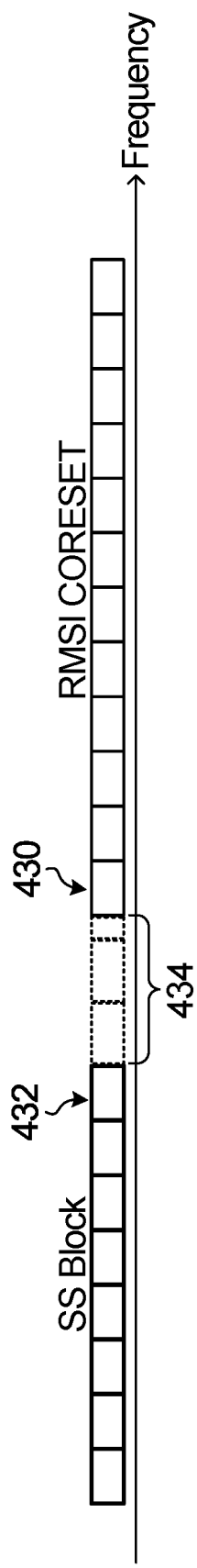
FIG. 6D is a time-frequency diagram showing a second example of a CORESET time-frequency configuration in which the CORESET is frequency division multiplexed with a SSB and is substantially right-aligned in frequency with the SSB in accordance with an embodiment of the present disclosure.

FIG. 6D is a time-frequency diagram showing a second example of a CORESET time-frequency configuration in which the CORESET is frequency division multiplexed with a SSB and is substantially right-aligned in frequency with the SSB in accordance with an embodiment of the present disclosure.

In particular, it is noted that in the example embodiment shown in FIG. 6D the CORESET is configured such that the lowest PRB 430 of the CORESET is separated from the highest PRB 432 of the SSB by a guard 434 comprising at least G PRBs, where G=2. Similar to the left-aligned FOM example shown in FIG. 6B, in this example the total frequency offset between CORESET and the SSB provided by the guard 434 includes the two guard PRBs (PRBs according to the RMSI 25 numerology) and the additional offset due to a difference between the PRB grids used for RMSI and SSB.

Figure 6E:
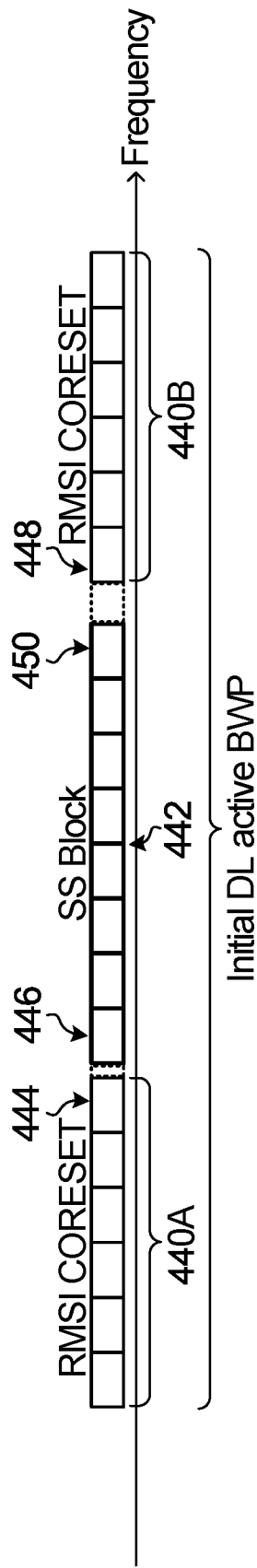
FIG. 6E is a time-frequency diagram showing an example of a CORESET time-frequency configuration in which the CORESET is frequency division multiplexed with a SSB and is substantially center-aligned in frequency with the SSB in accordance with an embodiment of the present disclosure.

FIG. 6E is a time-frequency diagram showing an example of a CORESET time-frequency configuration in which the CORESET is frequency division multiplexed with a SSB and is substantially center-aligned in frequency with the SSB in accordance with an embodiment of the present disclosure.

Figure 6F:
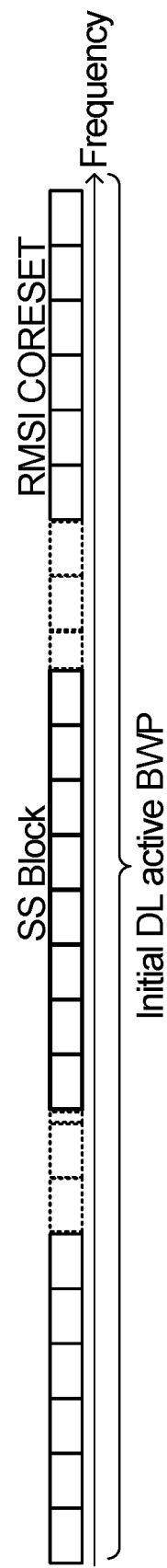
FIG. 6F is a time-frequency diagram showing an example of a CORESET time-frequency configuration in which the CORESET is frequency division multiplexed with a SSB and is substantially center-aligned in frequency with the SSB in accordance with an embodiment of the present disclosure where upper and lower portions of the CORESET are offset in frequency from the SSB by G physical resource blocks (PRBs), where G is an integer >1.
Figure 7C:
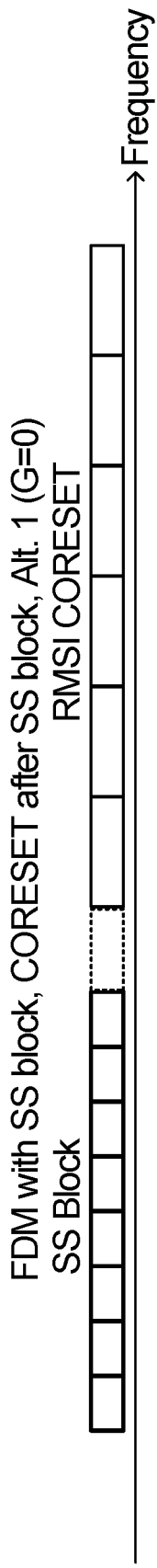
FIG. 7C is a time-frequency diagram showing a first example of a CORESET time-frequency configuration in which the CORESET is frequency division multiplexed with a SSB and is substantially right-aligned in frequency with the SSB in accordance with an embodiment of the present disclosure where the subcarrier spacing (SCS) of SSB is smaller than the SCS of CORESET and RMSI.
Figure 7D:
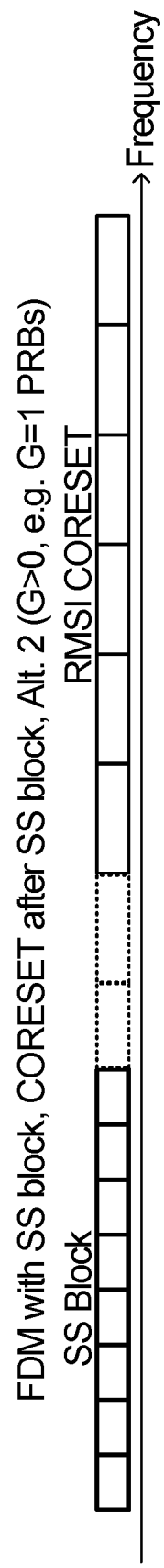
FIG. 7D is a time-frequency diagram showing a second example of a CORESET time-frequency configuration in which the CORESET is frequency division multiplexed with a SSB and is substantially right-aligned in frequency with the SSB in accordance with an embodiment of the present disclosure where the subcarrier spacing (SCS) of SSB is smaller than the SCS of CORESET and RMSI.
Figure 7E:
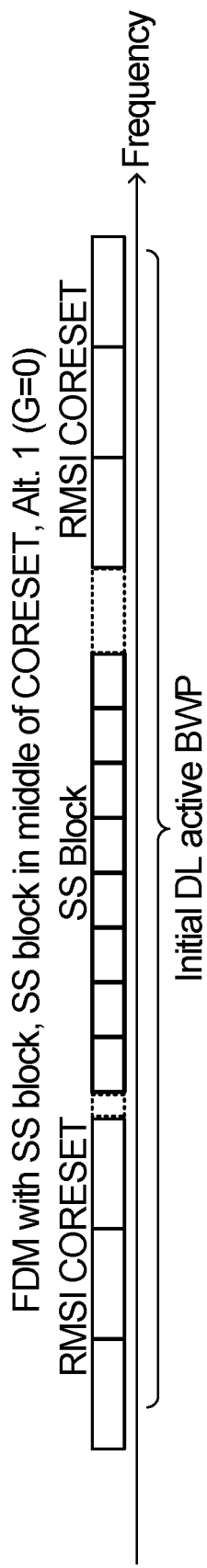
FIG. 7E is a time-frequency diagram showing an example of a CORESET time-frequency configuration in which the CORESET is frequency division multiplexed with a SSB and is substantially center-aligned in frequency with the SSB in accordance with an embodiment of the present disclosure where the subcarrier spacing (SCS) of SSB is smaller than the SCS of CORESET and RMSI.
Figure 7F:
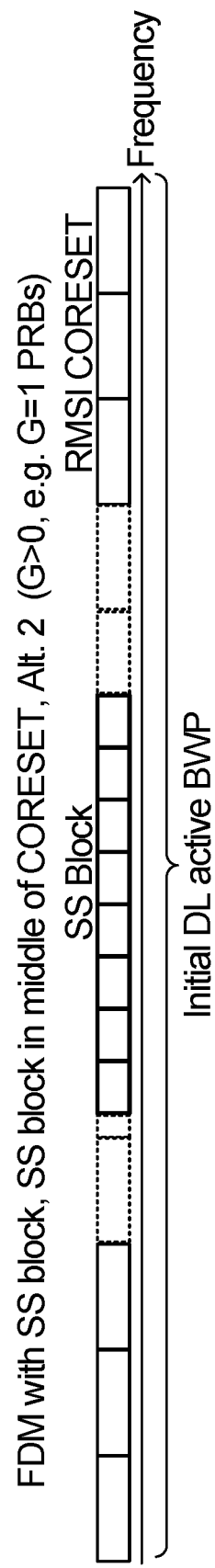
FIG. 7F is a time-frequency diagram showing an example of a CORESET time-frequency configuration in which the CORESET is frequency division multiplexed with a SSB and is substantially center-aligned in frequency with the SSB in accordance with an embodiment of the present disclosure where upper and lower portions of the CORESET are offset in frequency from the SSB by G physical resource blocks (PRBs), where G is an integer >1, and the subcarrier spacing (SCS) of SSB is smaller than the SCS of CORESET and RMSI.
Figure 8A:
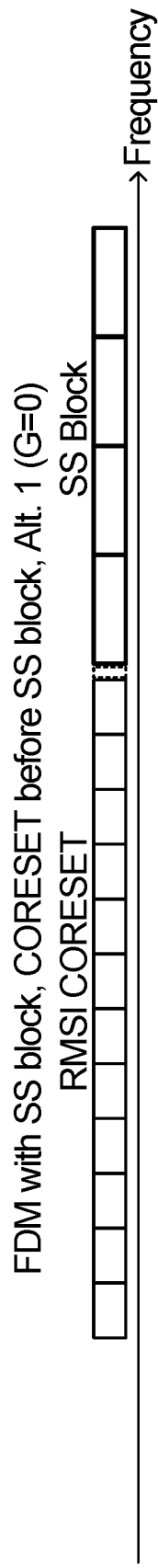
FIG. 8A is a time-frequency diagram showing a first example of a CORESET time-frequency configuration in which the CORESET is frequency division multiplexed with a SSB and is substantially left-aligned in frequency with the SSB in accordance with an embodiment of the present disclosure where the subcarrier spacing (SCS) of SSB is larger than the SCS of CORESET and RMSI.
Figure 8B:
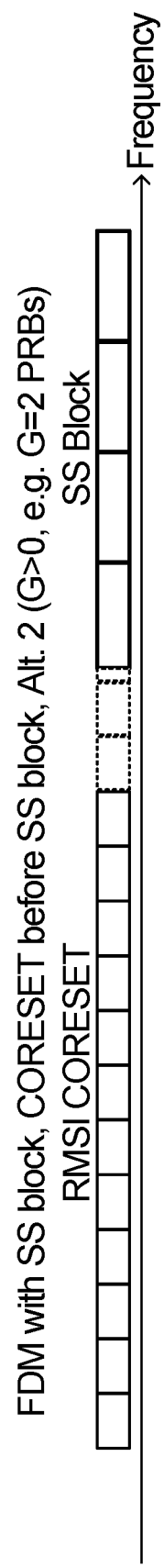
FIG. 8B is a time-frequency diagram showing a second example of a CORESET time-frequency configuration in which the CORESET is frequency division multiplexed with a SSB and is substantially left-aligned in frequency with the SSB in accordance with an embodiment of the present disclosure where the subcarrier spacing (SCS) of SSB is larger than the SCS of CORESET and RMSI.
Figure 8E:
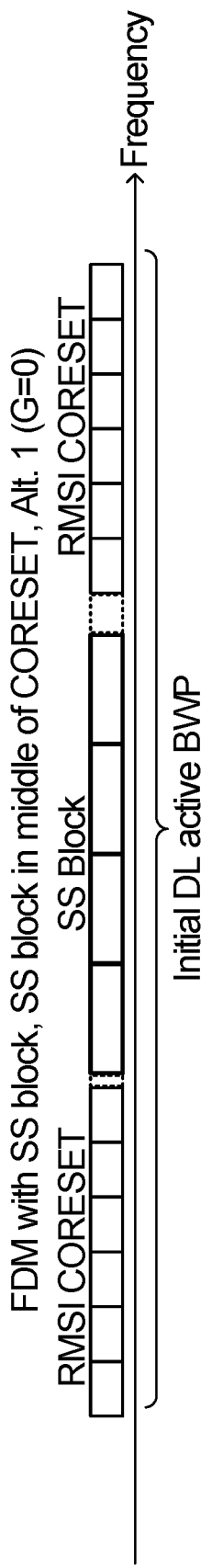
FIG. 8E is a time-frequency diagram showing an example of a CORESET time-frequency configuration in which the CORESET is frequency division multiplexed with a SSB and is substantially center-aligned in frequency with the SSB in accordance with an embodiment of the present disclosure where the subcarrier spacing (SCS) of SSB is larger than the SCS of CORESET and RMSI.
Figure 8F:
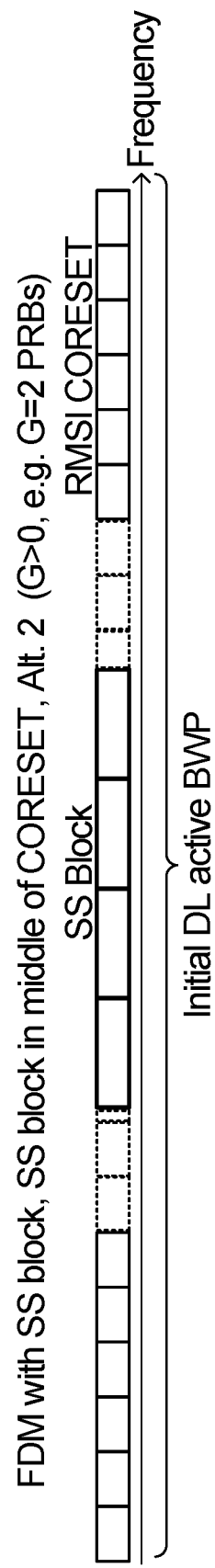
FIG. 8F is a time-frequency diagram showing an example of a CORESET time-frequency configuration in which the CORESET is frequency division multiplexed with a SSB and is substantially center-aligned in frequency with the SSB in accordance with an embodiment of the present disclosure where upper and lower portions of the CORESET are offset in frequency from the SSB by G physical resource blocks (PRBs), where G is an integer ≥1, and the subcarrier spacing (SCS) of SSB is larger than the SCS of CORESET and RMSI.

In particular, it is noted that in the example embodiment shown in FIG. 6E the CORESET is configured such that the CORESET includes two substantially equal sized portions 440A, 440B separated in frequency by the SSB with the center frequency location 442 of the SSB being substantially midway between the two portions of the CORESET. More specifically, in the illustrated example the highest PRB 444 of the lower one of the two portions of the CORESET is the highest PRB among those whose subcarriers all lie before the lowest PRB 446 of the SSB and the lowest PRB 448 of the upper one of the two portions of the CORESET is the lowest PRB among those whose subcarriers all lie after the highest PRB 450 of the SSB. In some embodiments, the upper and lower portions of the CORESET may be offset in frequency from the SSB by G PRB (PRB according to the RMSI numerology), where G is an integer >1. An example of such an embodiment is shown in FIG. 6F.

FIGS. 7A, 7B, 7C, 7D, 7E and 7F are time-frequency diagrams that depict frequency location alignments between SSB and CORESET corresponding to those shown in FIGS. 6A, 6B, 6C, 6D, 6E and 6F, but in FIGS. 7A, 7B, 7C, 7D, 7E and 7F the SCS of SSB is smaller than the SCS of CORESET and RMSI. For example, SSB may have a 15 KHz SCS and CORESET may have a 30 KHz SCS. Similarly, FIGS. 8A, 8B, 8C, 8D, 8E and 8F are time-frequency diagrams that depict frequency location alignments between SSB 888 and CORESET corresponding to those shown in FIGS. 6A, 6B, 6C, 6D, 6E and 6F, but in FIGS. 7A, 7B, 7C, 7D, 7E and 7F the SCS of SSB is larger than the SCS of CORESET and RMSI. For example, SSB may have a 30 KHz SCS and CORESET may have a 15 KHz SCS. Similarly to the single numerology cases shown in FIGS. 6A-6F, where the guard PRB are of RMSI numerology, in mixed numerologies cases, such as in FIGS. 7A-7F and 8A-8F, the guard PRB may also be of RMSI numerology.

In some embodiments, rather than using one CORESET time-frequency configuration table, multiple sub-tables may be used for configuration of the CORESET. For example, in some embodiments, a first subset of the configuration parameters defining the time-frequency configuration of CORESET may be indicated by an m1-bit code in PBCH in conjunction with a first pre-defined CORESET configuration sub-table, where the m1-bit code is used to signal an index (I) to a row in the first CORESET configuration sub-table, and a second subset of the configuration parameters defining the time-frequency configuration of CORESET may be indicated by an m2-bit code in PBCH in conjunction with a second pre-defined CORESET configuration sub-table, where the m2-bit code is used to signal an index (J) to a row in the second CORESET configuration sub-table. Such embodiments are potentially advantageous because they allow the two subsets of configuration parameters to be independently signaled using m1 bits to signal index I and m2 bits to signal index J (m1+m2=m) For example, in some embodiments the first CORESET configuration sub-table may include frequency configuration parameters, and thus may be considered a CORESET frequency configuration table, while the second CORESET configuration sub-table may include time configuration parameters, and thus may be considered an RMSI time configuration table. FIG. 9 includes two sub-tables depicting CORESET frequency configurations and CORESET time configurations, respectively, and associated indexes and configuration parameters in accordance with such an embodiment. In other embodiments, one or more of the CORESET configuration sub-tables may include time and frequency configuration parameters. For example, FIG. 10 includes two CORESET configuration sub-tables, where a first sub-table includes CORESET-SSB relative time-frequency location configurations and associated indexes and configuration parameters, and a second sub-table includes CORESET time-frequency configurations and associated indexes and configuration parameters.

In some embodiments, the configuration of CORESET or initial active DL BWP may depend on the SCS of CORESET. For example, the frequency size of the CORESET in terms of number of PRBs can depend on the SCS of CORESET. As an example, FIG. 11 shows sets of possible values for the frequency size of the CORESET for different SCS of CORESET for a system operating below 6 GHz. FIG. 12 shows sets of possible values for the frequency size of the CORESET for different SCS of CORESET for a system operating above 6 GHz. For each SCS, a subset of two or more values from the set of possible values are used for the frequency size of CORESET in the CORESET configuration table or sub-table.

It should be noted that some or all of the values of the example parameters shown in the tables depicted in FIGS. 2, 9 and 10 may depend on the operating frequency range/band (e.g. different values may be used for the given parameters for operation below and above 6 GHz).

It should also be noted that some of values of the example parameters shown in the tables depicted in FIGS. 2, 9 and 10 may be predefined. For example, CORESET REG bundle size and/or CORESET transmission type can be predefined.

In some embodiments, the CORESET time-frequency configuration may be hopped among different CORESET time-frequency configurations according to a predefined CORESET hopping pattern and periodicity such that the CORESET configuration is hopped among at least a subset of the possible CORESET configurations. Such CORESET configuration hopping may be beneficial in terms of providing PDCCH diversity. The hopping periodicity may be predefined or it may be configurable (e.g., signaled explicitly).

Figure 13A:
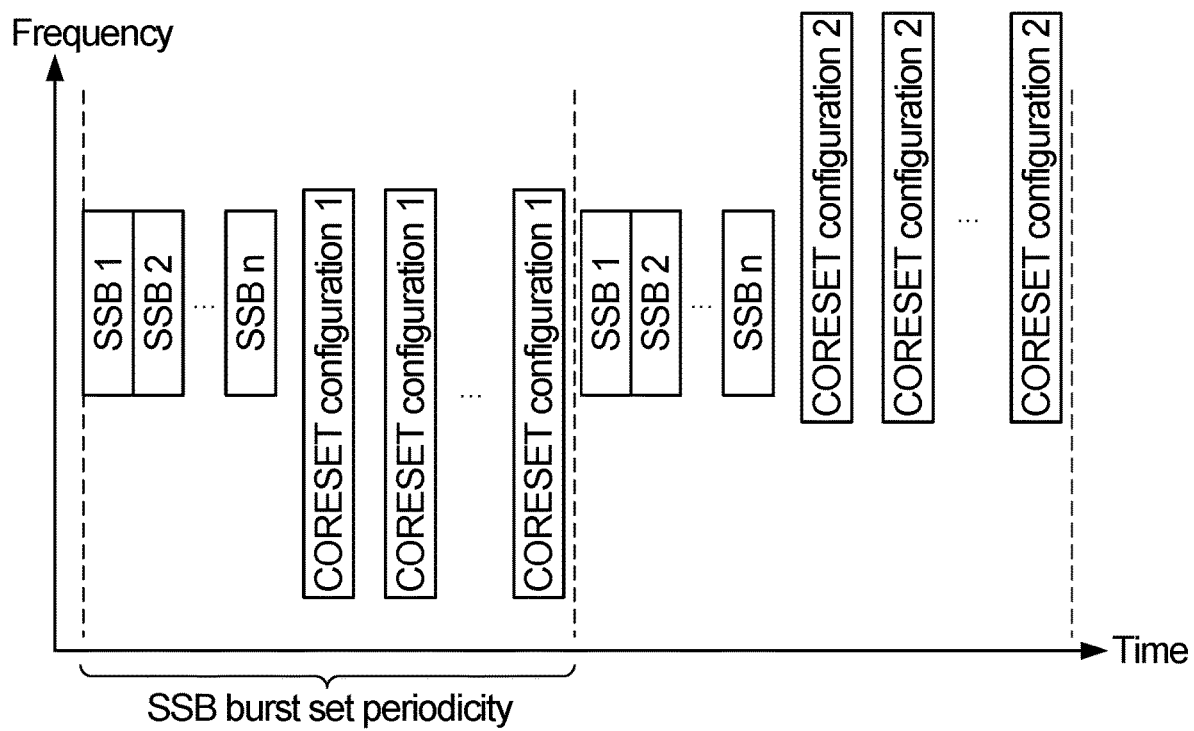
FIG. 13A is a time-frequency diagram showing an example of CORESET time-frequency configuration hopping in accordance with an embodiment of the present disclosure in which the CORESET is time division multiplexed with a SSB.
Figure 13B:
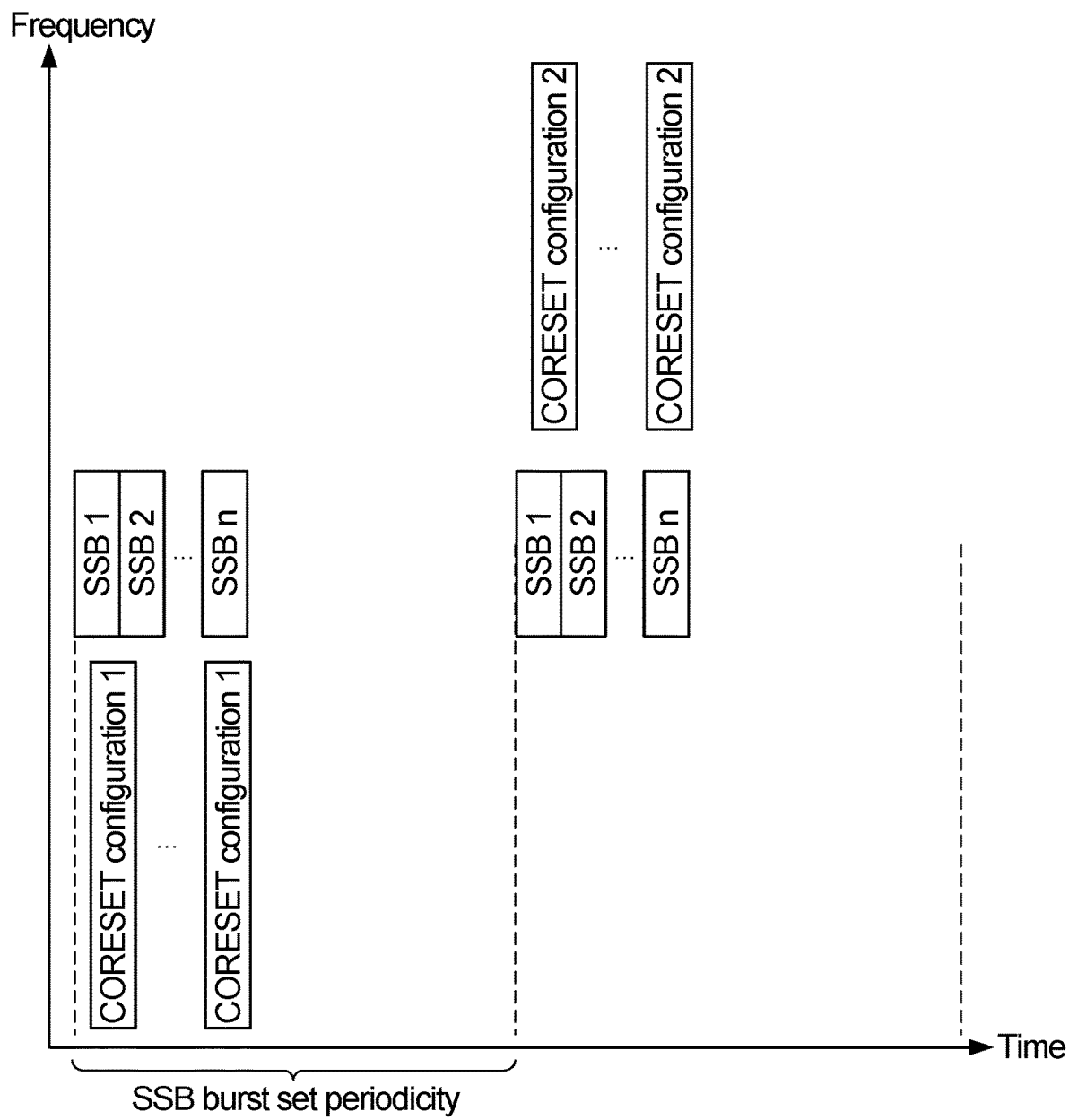
FIG. 13B is a time-frequency diagram showing an example of CORESET time-frequency configuration hopping in accordance with an embodiment of the present disclosure in which the CORESET is frequency division multiplexed with a SSB.

In some embodiments, the CORESET hopping periodicity is equal to the SSB burst set periodicity. FIGS. 13A and 13B are time-frequency diagrams showing examples of CORESET time-frequency configuration hopping in accordance with such an embodiment where the CORESET is time division multiplexed with a SSB (FIG. 13A) and frequency division multiplexed with a SSB (FIG. 13B). In particular, in both FIG. 13A and FIG. 13B the CORESET time-frequency configuration is hopped from a first time-frequency configuration (CORESET configuration 1) for a first SSB burst set (including n SSB) to a second time-frequency configuration (CORESET configuration 2) for the next SSB burst set.

In some embodiments, the plurality of CORESET configurations are partitioned into multiple subsets and the CORESET configuration is hopped among CORESET configurations within a given subset. For example, the subsets may include a first subset of TDM based configurations that define the CORESET as being time division multiplexed with the SSB (e.g., see FIG. 13A), and a second subset of FDM based configurations that define the CORESET as being frequency division multiplexed with the SSB (e.g., see FIG. 13B).

Figure 14:
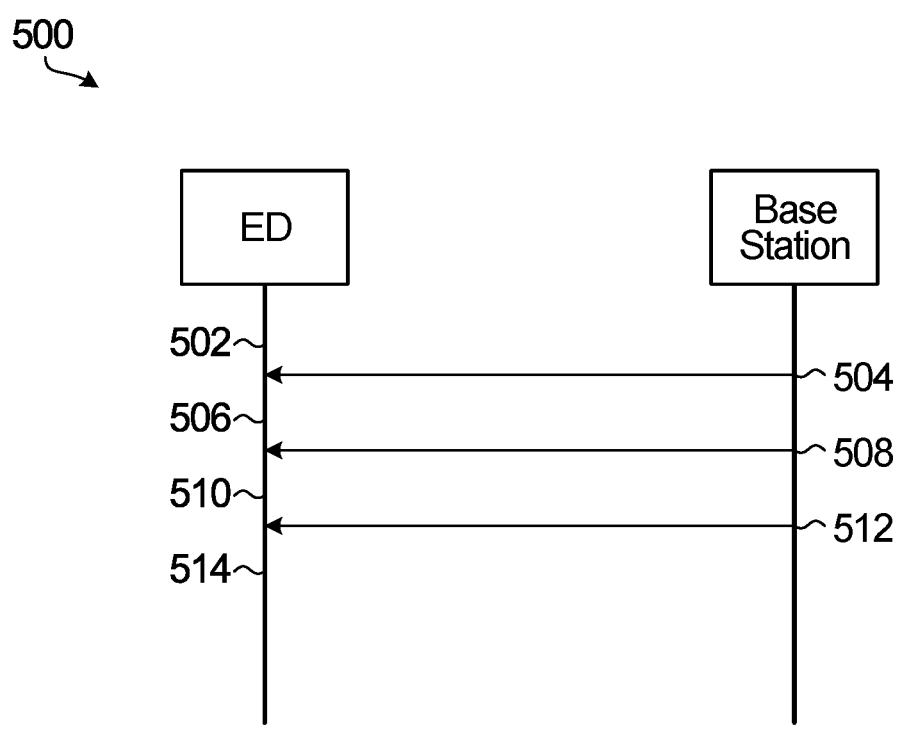
FIG. 14 is an initial access call flow diagram of example operations in a communications system in accordance with an embodiment of the present disclosure.

FIG. 14 is an initial access call flow diagram of example operations 500 in a communications system in accordance with an embodiment of the present disclosure.

The initial access operations begin at 502 when an ED is powered on and begins monitoring for a SSB.

At 504, a base station broadcasts a SSB that includes information indicating a CORESET configuration index. The CORESET configuration index is one of a plurality of CORESET configuration indexes, each CORESET configuration index being associated with a respective configuration of a CORESET. Each configuration includes a frequency location configuration of the CORESET selected from a set of predefined frequency location configurations defined with respect to the SSB. The set of predefined frequency location configurations may consist of the first, second and third frequency location configurations discussed earlier.

At 506, the ED receives the information indicating the CORESET configuration index as part of the SSB and configures, in accordance with the frequency location configuration corresponding to the CORESET configuration index indicated by the received information, an initial active downlink bandwidth part for receiving downlink transmissions.

At 508, the base station transmits, as part of a PDCCH within the CORESET configured in accordance with the CORESET configuration index, information indicating scheduling of RMSI in a PDSCH.

At 510, the ED receives the information indicating the scheduling of RMSI in the PDCSH.

At 512, the base station transmits RMSI in the PDCSH according to the scheduling.

At 514, the ED receives the RMSI in the PDCSH and used the RMSI to configure itself for communication with the system and complete its initial access procedure.

Figure 15:
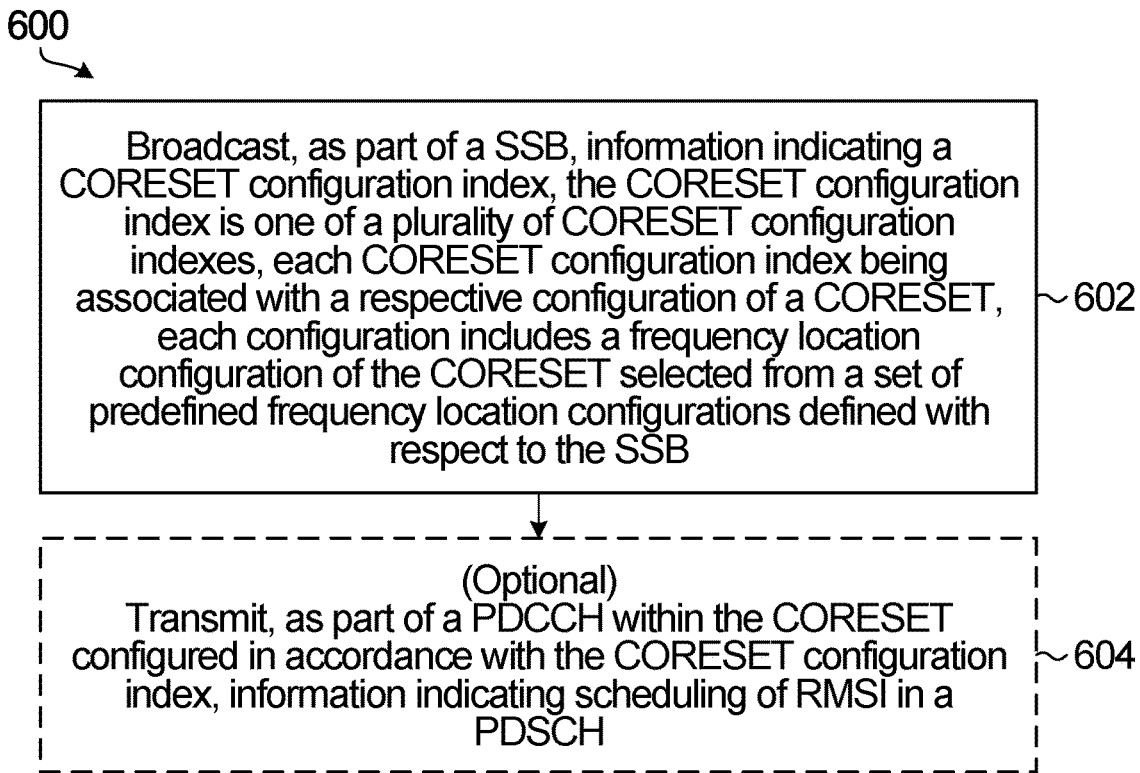
FIG. 15 is a flow diagram of example operations in a base station in accordance with an embodiment of the present disclosure.

FIG. 15 is a flow diagram of example operations 600 in a base station in accordance with an embodiment of the present disclosure In block 602, the base station broadcasts, as part of a SSB, information indicating a CORESET configuration index, the CORESET configuration index is one of a plurality of CORESET configuration indexes, each CORESET configuration index being associated with a respective configuration of a CORESET, each configuration includes a frequency location configuration of the CORESET selected from a set of predefined frequency location configurations defined with respect to the SSB. The set of predefined frequency location configurations may consist of the first, second and third frequency location configurations discussed earlier.

Optionally, in block 604, the base station transmits, as part of a PDCCH within the CORESET configured in accordance with the CORESET configuration index, information indicating scheduling of RMSI in a PDCSH.

The example operations 600 are illustrative of an example embodiment. Various ways to perform the illustrated operations, as well as examples of other operations that may be performed, are described herein. Further variations may be or become apparent.

Figure 16:
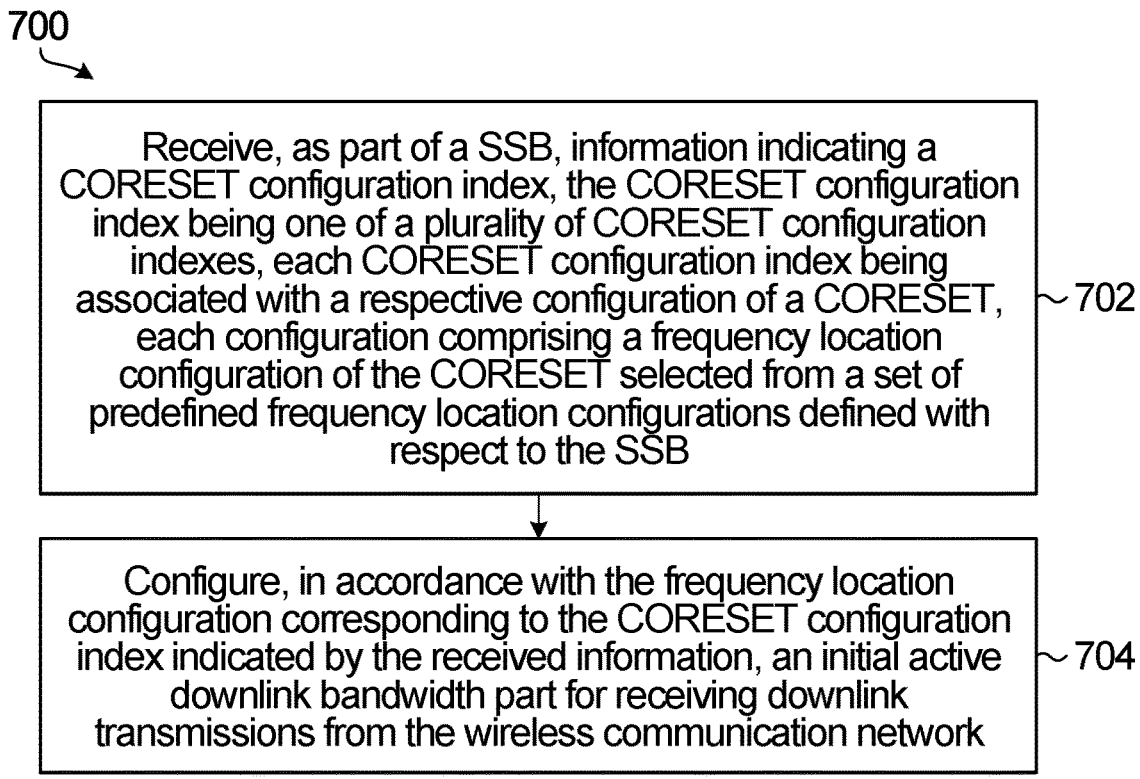
FIG. 16 is a flow diagram of examples operations in an ED in accordance with an embodiment of the present disclosure.

FIG. 16 is a flow diagram of examples operations 700 in an electronic device in accordance with an embodiment of the present disclosure.

In block 702, the electronic device receives, as part of a SSB, information indicating a CORESET configuration index, the CORESET configuration index being one of a plurality of CORESET configuration indexes, each CORESET configuration index being associated with a respective configuration of a CORESET, each configuration comprising a frequency location configuration of the CORESET selected from a set of predefined frequency location configurations defined with respect to the SSB. The set of predefined frequency location configurations may consist of the first, second and third frequency location configurations discussed earlier.

In block 704, the electronic device configures, in accordance with the frequency location configuration corresponding to the CORESET configuration index indicated by the received information, an initial active downlink bandwidth part for receiving downlink transmissions from the wireless communication network.

The example operations 700 are illustrative of an example embodiment. Various ways to perform the illustrated operations, as well as examples of other operations that may be performed, are described herein. Further variations may be or become apparent.

Figure 17:
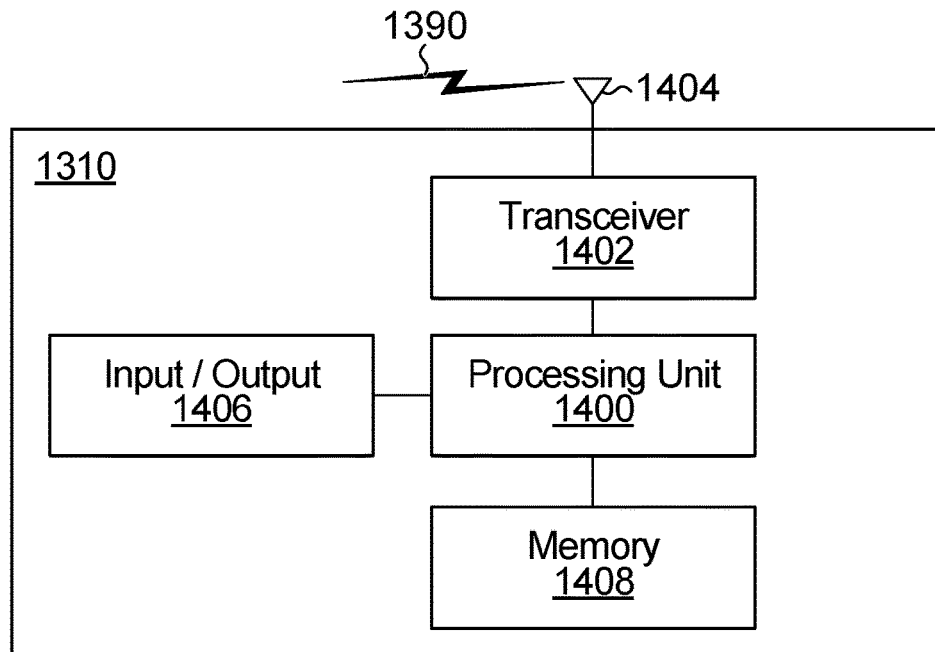
FIG. 17 is a block diagram of an example ED in accordance with an embodiment of the present disclosure.
Figure 18:
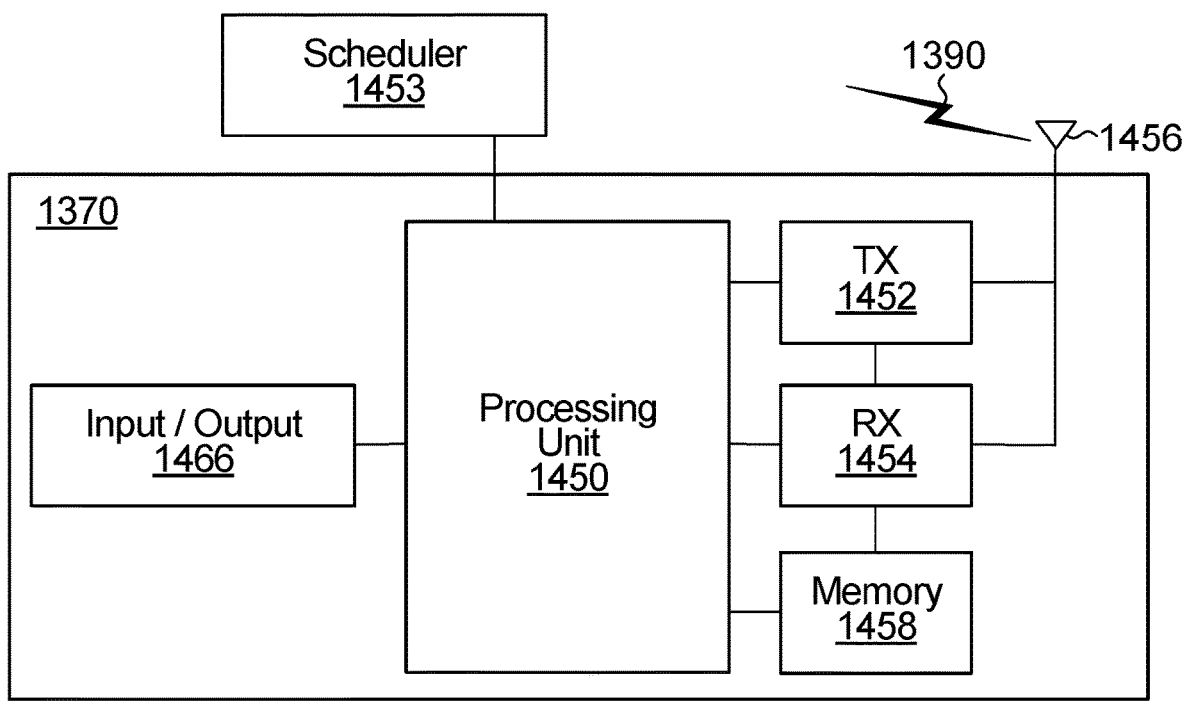
FIG. 18 is a block diagram of an example base station in accordance with an embodiment of the present disclosure.

FIGS. 17 and 18 illustrate example devices that may implement the methods and teachings according to this disclosure. In particular, FIG. 17 illustrates an example ED 110, and FIG. 18 illustrates an example base station 1370. These components could be used in the communication system 100 shown in FIG. 1 or in any other suitable system.

As shown in FIG. 17, the ED 1310 includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 100. The processing unit 1400 may also be configured to implement some or all of the functionality and/or embodiments described in more detail above. Each processing unit 200 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310. One or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the internet 150). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 1310. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 18, the base station 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 1370. The processing unit 1450 implements various processing operations of the base station 1370, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310. The memory 1458 stores instructions and data used, generated, or collected by the base station 1370. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding EDs and base stations are known to those of skill in the art. As such, these details are omitted here for clarity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other figures are also intended solely for illustrative purposes.

Other implementation details could also vary between different embodiments. For example, some of the examples above refer to NR and LTE terminology. However, the embodiments disclosed herein are not in any way limited to NR or LTE systems.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for a base station in a wireless communication network, the method comprising:
   broadcasting, as part of a synchronization signal block (SSB), a control resource set (CORESET) configuration index, the CORESET configuration index being one of a plurality of CORESET configuration indexes, each CORESET configuration index being associated with a respective configuration of a CORESET, each configuration comprising: a CORESET frequency size, a CORESET time duration, and a frequency offset of the CORESET with respect to the SSB, the frequency offset selected from a set of predefined frequency offsets, the set of predefined frequency offsets comprising at least one of:
      a first frequency offset wherein a lowest physical resource block (PRB) of the CORESET is a highest PRB whose subcarrier 0 lies on or before a subcarrier 0 of a lowest PRB of the SSB,
      a second frequency offset wherein a highest PRB of the CORESET is a lowest PRB whose subcarrier 0 lies on or after a subcarrier 0 of a highest PRB of the SSB,
      a third frequency offset wherein a center PRB of the CORESET is a highest PRB whose subcarrier 0 lies on or before a subcarrier 0 of a center PRB of the SSB,
      a fourth frequency offset wherein the highest PRB of the CORESET is separated from the lowest PRB of the SSB by a first guard, the first guard comprising at least $G_1$ PRBs having a subcarrier spacing for a remaining minimum system information (RMSI) transmission, where $G_1$ is an integer >0, or
      a fifth frequency offset wherein the lowest PRB of the CORESET is separated from the highest PRB of the SSB by a second guard, the second guard comprising at least $G_2$ PRBs having the subcarrier spacing for the RMSI transmission, where $G_2$ is an integer >0.

2. The method of claim 1, wherein a value of the frequency offset is a number PRBs of a PRB grid, the PRB grid having a subcarrier spacing for the RMSI transmission.

3. The method of claim 1, wherein the CORESET configuration associated with the CORESET configuration index is based on a subcarrier spacing of the CORESET.

4. The method of claim 1, wherein the CORESET configuration associated with the CORESET configuration index is based on an operating frequency range of the wireless communication network.

5. The method of claim 1, wherein the CORESET configuration index is for indicating a first CORESET sub-configuration, the method further comprising:
   broadcasting, as part of the SSB, a second CORESET configuration index, the second CORESET configuration index for indicating a second CORESET sub-configuration, each second sub-configuration comprising a time configuration of the CORESET.

6. A method for an electronic device (ED) in a wireless communication network, the method comprising:
   receiving, as part of a synchronization signal block (SSB), a control resource set (CORESET) configuration index, the CORESET configuration index being one of a plurality of CORESET configuration indexes, each CORESET configuration index being associated with a respective configuration of a CORESET, each configuration comprising: a CORESET frequency size, a CORESET time duration, and a frequency offset of the CORESET with respect to the SSB, the frequency offset selected from a set of predefined frequency offsets, the set of predefined frequency offsets comprising at least one of:
      a first frequency offset wherein a lowest physical resource block (PRB) of the CORESET is a highest PRB whose subcarrier 0 lies on or before a subcarrier 0 of a lowest PRB of the SSB,
      a second frequency offset wherein a highest PRB of the CORESET is a lowest PRB whose subcarrier 0 lies on or after a subcarrier 0 of a highest PRB of the SSB,
      a third frequency offset wherein a center PRB of the CORESET is a highest PRB whose subcarrier 0 lies on or before a subcarrier 0 of a center PRB of the SSB,
      a fourth frequency offset wherein the highest PRB of the CORESET is separated from the lowest PRB of the SSB by a first guard, the first guard comprising at least $G_1$ PRBs having a subcarrier spacing for a remaining minimum system information (RMSI) transmission, where $G_1$ is an integer >0, or a fifth frequency offset wherein the lowest PRB of the CORESET is separated from the highest PRB of the SSB by a second guard, the second guard comprising at least $G_2$ PRBs having the subcarrier spacing for the RMSI transmission, where $G_2$ is an integer >0; and configuring, in accordance with the CORESET configuration associated with the CORESET configuration index, an initial active downlink bandwidth part for receiving downlink transmissions from the wireless communication network.

7. The method of claim 6, wherein a value of the frequency offset is a number PRBs of a PRB grid, the PRB grid having a subcarrier spacing for the RMSI transmission.

8. The method of claim 6, wherein the CORESET configuration associated with the CORESET configuration index is based on a subcarrier spacing of the CORESET.

9. The method of claim 6, wherein the CORESET configuration associated with the CORESET configuration index is based on an operating frequency range of the wireless communication network.

10. The method of claim 6, wherein the CORESET configuration index is for indicating a first CORESET sub-configuration, the method further comprising:
receiving, as part of the SSB, a second CORESET configuration index, the second CORESET configuration index for indicating a second CORESET sub-configuration, each second sub-configuration comprising a time configuration of the CORESET.

11. A base station in a wireless communication network, the base station comprising:
a memory storage comprising instructions; and
one or more processors in communication with the memory storage, wherein the one or more processors execute the instructions to:
broadcast, as part of a synchronization signal block (SSB), a control resource set (CORESET) configuration index, the CORESET configuration index being one of a plurality of CORESET configuration indexes, each CORESET configuration index being associated with a respective configuration of a CORESET, each configuration comprising: a CORESET frequency size, a CORESET time duration, and a frequency offset of the CORESET with respect to the SSB, the frequency offset selected from a set of predefined frequency offsets, the set of predefined frequency offsets comprising at least one of:
a first frequency offset wherein a lowest physical resource block (PRB) of the CORESET is a highest PRB whose subcarrier 0 lies on or before a subcarrier 0 of a lowest PRB of the SSB,
a second frequency offset wherein a highest PRB of the CORESET is a lowest PRB whose subcarrier 0 lies on or after a subcarrier 0 of a highest PRB of the SSB,
a third frequency offset wherein a center PRB of the CORESET is a highest PRB whose subcarrier 0 lies on or before a subcarrier 0 of a center PRB of the SSB,
a fourth frequency offset wherein the highest PRB of the CORESET is separated from the lowest PRB of the SSB by a first guard, the first guard comprising at least $G_1$ PRBs having a subcarrier spacing for a remaining minimum system information (RMSI) transmission, where $G_1$ is an integer >0, or a fifth frequency offset wherein the lowest PRB of the CORESET is separated from the highest PRB of the SSB by a second guard, the second guard comprising at least $G_2$ PRBs having the subcarrier spacing for the RMSI transmission, where $G_2$ is an integer >0.

12. The base station of claim 11, wherein a value of the frequency offset is a number PRBs of a PRB grid, the PRB grid having a subcarrier spacing for the RMSI transmission.

13. The base station of claim 11, wherein the CORESET configuration associated with the CORESET configuration index is based on a subcarrier spacing of the CORESET.

14. The base station of claim 11, wherein the CORESET configuration associated with the CORESET configuration index is based on an operating frequency range of the wireless communication network.

15. The base station of claim 11, wherein the CORESET configuration index is for indicating a first CORESET sub-configuration, and the one or more processors further execute the instructions to:
broadcast, as part of the SSB, a second CORESET configuration index, the second CORESET configuration index for indicating a second CORESET sub-configuration, each second sub-configuration comprising a time configuration of the CORESET.

16. An electronic device (ED) in a wireless communication network, the ED comprising:
a memory storage comprising instructions; and
one or more processors in communication with the memory storage, wherein the one or more processors execute the instructions to:
receive, as part of a synchronization signal block (SSB), a control resource set (CORESET) configuration index, the CORESET configuration index being one of a plurality of CORESET configuration indexes, each CORESET configuration index being associated with a respective configuration of a CORESET, each configuration comprising: a CORESET frequency size, a CORESET time duration, and a frequency offset of the CORESET with respect to the SSB, the frequency offset selected from a set of predefined frequency offsets, the set of predefined frequency offsets comprising at least one of:
a first frequency offset wherein a lowest physical resource block (PRB) of the CORESET is a highest PRB whose subcarrier 0 lies on or before a subcarrier 0 of a lowest PRB of the SSB,
a second frequency offset wherein a highest PRB of the CORESET is a lowest PRB whose subcarrier 0 lies on or after a subcarrier 0 of a highest PRB of the SSB,
a third frequency offset wherein a center PRB of the CORESET is a highest PRB whose subcarrier 0 lies on or before a subcarrier 0 of a center PRB of the SSB,
a fourth frequency offset wherein the highest PRB of the CORESET is separated from the lowest PRB of the SSB by a first guard, the first guard comprising at least $G_1$ PRBs having a subcarrier spacing for a remaining minimum system information (RMSI) transmission, where $G_1$ is an integer >0, or a fifth frequency offset wherein the lowest PRB of the CORESET is separated from the highest PRB of the SSB by a second guard, the second guard comprising at least $G_2$ PRBs having the subcarrier spacing for the RMSI transmission, where $G_2$ is an integer >0; and configure, in accordance with the CORESET configuration associated with the CORESET configuration index, an initial active downlink bandwidth part for receiving downlink transmissions from the wireless communication network.

17. The electronic device of claim 16, wherein a value of the frequency offset is a number PRBs of a PRB grid, the PRB grid having a subcarrier spacing for the RMSI transmission.

18. The electronic device of claim 16, wherein the CORESET configuration associated with the CORESET configuration index is based on a subcarrier spacing of the CORESET.

19. The electronic device of claim 16, wherein the CORESET configuration associated with the CORESET configuration index is based on an operating frequency range of the wireless communication network.

20. The electronic device of claim 16, wherein the CORESET configuration index is for indicating a first CORESET sub-configuration, and the one or more processors further execute the instructions to:

receive, as part of the SSB, a second CORESET configuration index, the second CORESET configuration index for indicating a second CORESET sub-configuration, each second sub-configuration comprising a time configuration of the CORESET.

* * * * *